United States Patent
Muraki et al.

(10) Patent No.: US 8,690,498 B2
(45) Date of Patent: Apr. 8, 2014

(54) CUTTING MACHINING METHOD AND CUTTING MACHINING APPARATUS

(75) Inventors: Toshiyuki Muraki, Aichi-pref. (JP);
Yukihide Harada, Gifu-pref. (JP); Yuki Yamamoto, Aichi-pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 0 days.

(21) Appl. No.: 13/497,599

(22) PCT Filed: Apr. 19, 2010

(86) PCT No.: PCT/JP2010/056935
§ 371 (c)(1),
(2), (4) Date: Mar. 22, 2012

(87) PCT Pub. No.: WO2011/132252
PCT Pub. Date: Oct. 27, 2011

(65) Prior Publication Data
US 2012/0230792 A1    Sep. 13, 2012

(51) Int. Cl.
*B23C 3/34* (2006.01)

(52) U.S. Cl.
USPC ............ 409/132; 409/143; 409/201; 409/165

(58) Field of Classification Search
USPC ......... 409/131, 132, 143, 201, 211, 216, 165, 409/166; 451/246, 242
See application file for complete search history.

(56) References Cited

U.S. PATENT DOCUMENTS

| | | | |
|---|---|---|---|
| 3,839,942 A | | 10/1974 | Ferchland |
| 4,517,769 A | * | 5/1985 | Fujimoto ........................ 451/41 |
| 7,303,461 B1 | * | 12/2007 | Campomanes et al. ........ 451/28 |
| 2007/0172319 A1 | * | 7/2007 | Meier et al. ..................... 407/30 |
| 2013/0000121 A1 | * | 1/2013 | Burgess ..................... 29/889.23 |

FOREIGN PATENT DOCUMENTS

| | | |
|---|---|---|
| JP | 48-074694 | 10/1973 |
| JP | 50-038189 | 4/1975 |
| JP | 62-068216 | 3/1987 |
| JP | 11-300505 | 11/1999 |
| JP | 2003-117716 | 4/2003 |
| JP | 3757807 | 1/2006 |

OTHER PUBLICATIONS

International Search Report for corresponding International Application No. PCT/JP2010/056935 mailed Jun. 8, 2010.
Written Opinion (Form PCT/ISA/237) for corresponding International Application No. PCT/JP2010/056935 mailed Jun. 8, 2010 and English translation.
Notification of Reasons for Refusal for corresponding Japanese Application No. 2010-529182 dated Feb. 1, 2011 and English translation.

* cited by examiner

*Primary Examiner* — Erica E Cadugan
(74) *Attorney, Agent, or Firm* — Renner, Otto, Boisselle & Sklar, LLP

(57) ABSTRACT

When machining of a circumferential groove is performed by advancing a cutting tool which is attached to a rotating shaft extending to an inner side from an outer side of a rotating work into the work in a depth direction, the rotating shaft is downwardly inclined toward the inner side of the work at a predetermined inclination angle, a trajectory of a cutting edge within the work is arranged to be an ellipse of which minor axis is oriented in the radial direction connecting a deepest point thereof and the center of the work as viewing in a plane view, and the work is cut as lowering the cutting tool until reaching groove depth of a machining target while maintaining the inclination angle, so that deviation occurring in a direction of an axis toward a work center axis in parallel to a work face from a point on the work face on which the deepest point is projected or an axis of the rotating shaft of the cutting tool projected on the work face can be arbitrarily set.

6 Claims, 23 Drawing Sheets

Disc    Blade

Disc section (A-A')

Rectangular cutting edge to improve finish shape of groove

CUTTING MACHINING METHOD AND CUTTING MACHINING APPARATUS

TECHNICAL FIELD

The present invention relates to a cutting machining method for a lathe and a cutting machining apparatus, and in particular, relates to a technology to remarkably improve machining accuracy and machining efficiency of a groove without having tool lifetime be shortened even when a work, such as rotating parts of a jet-engine for an airplane, which is particularly made of difficult-to-machine material is lathed to have a circular or arc-like groove.

BACKGROUND ART

It has been predicted that demand for airplanes will be increased to be twice of the current for airframes and 3.5 times of the current for engines within the next two decades. Improving fuel consumption of such sharply-increasing airplanes remarkably contributes to global environment in view of energy-saving and $CO_2$ reduction. Accordingly, development of various technologies has been vigorously performed in view of lightening airframes and improving engine output efficiency.

On the other hand, as a matter of course, airframes and engines for airplanes require extremely high safety performance as prerequisite. When designing respective structural parts, lightening has to be achieved while sufficiently maintaining strength and stiffness. Accordingly, light and high-strength material has been widely utilized. The above is similar to steam turbine engines which are utilized in thermal power stations.

In particular, for engine parts, it is absolutely necessary to increase combustion temperature for improving combustion efficiency. Accordingly, temperature of rotating parts of a jet engine reaches one thousand and several hundred degrees Celsius and rotation thereof reaches high speed as being several thousand rpm. Thus, it is required to adopt shape and material of parts which endure extremely large centrifugal force under high temperature conditions. Accordingly, high-strength heat-resistant alloy such as titanium alloy and nickel-base alloy has been adopted as material being superior in heat-resistant properties and corrosion-resistant properties in addition to being light with high strength.

Optimization-based design with structural analysis has been performed for designing such engine parts and the like. It has been required to perform machining such as welding, casting, forging, cutting, grinding and polishing at designed high accuracy. In particular, regarding cutting machining which largely influences part performance such as rotation accuracy, a feature of high-strength heat-resistant alloy itself that strength is less subject to decreasing even at high temperature has been a large obstacle for improving machining accuracy and machining efficiency. Such high-strength heat-resistant alloy is called difficult-to-cut material.

Here, when cutting temperature reaches high temperature, there may be supposed a case that strength of a work made of high-strength heat-resistant alloy exceeds strength of a cutting tool. Accordingly, there may be a case that a cutting edge is damaged and machining cannot be performed while machinability is drastically worsened.

With such a background, it has been strongly desired to develop a method and an apparatus to cut high-strength heat-resistant alloy called difficult-to-cut material such as titanium alloy and nickel-base alloy at high efficiency while reducing abrasion of a cutting tool.

Specific examples include a disc and blades of a turbine utilized for a jet engine as in FIGS. 1A and 1B. As can be seen from a sectional view of the disc, arc-like groove machining is required to be performed against a disc-shaped work as being hatched with broken lines. Traditionally, for performing turning of such an arc-like groove, machining methods such as machining with a turning tool, machining with an end mill, machining with a milling cutter and machining with a side cutter have been utilized and appropriately adopted corresponding to work material, dimensions of a machining groove, required machining accuracy or the like. However, when performing machining a work made of difficult-to-cut material particularly such as titanium alloy and nickel-base alloy, following problems have occurred respectively.

In the case of utilizing a turning tool, since a part of a cutting edge is continuously contacted to a work during machining, there may be a case that some errors occur at machining dimensions owing to tool abrasion and a case that machining cannot be performed owing to frequent occurrence of tool breakage as a tool is instantaneously heated and worn.

In the case of utilizing an end mill, since a cutting edge formed at a side face of a tool intermittently cuts a work, a part of the side face of the tool is not contacted. However, since a contacting arc between the tool and work is long, heating thereby cannot be avoided. Further, since a bottom face is continuously contacted, heating is apt to occur from the position thereof. In addition, since chips are accumulated to the inside of a groove formed by end mill machining, biting by the tool frequently occurs.

In the case of utilizing a milling cutter, there arise physical restrictions for machinable groove depth owing to interference of an outer face of a tool against a work end face or a groove outer wall, as illustrated in FIG. 2.

In the case of machining by utilizing a turning tool or an end mill, a part of a cutting edge is continuously contacted to a work. However, in the case of utilizing a side cutter, since cutting edges are arranged at the outer circumference of the side cutter at predetermined intervals, cutting is intermittently performed as illustrated in FIG. 3. Since the tool is cooled down during non-cutting duration, tool heating can be prevented compared to continuous cutting. It is advantageous in view of elongation of tool lifetime thereby.

In machining with a side cutter, depending on shape of a tool, the tool is forwarded in the cut direction while maintaining a rotating shaft of the tool to be horizontal against a machining face. FIGS. 4 to 6 illustrate how a groove is formed by actual machining in a case that machining is performed against a work W by utilizing a side cutter as target machining shape being a circumferential groove at predetermined radius with a vertical side wall.

Here, in a side cutter 1, cutting edges 4 are arranged at even intervals on an outer circumference of a disc 3 of which center is matched with the center of a shaft 2. In FIGS. 4A and 4B, the shaft 2 is lowered as being maintained continuously in parallel to the work W rotating in the counterclockwise direction. As contacting to the end face of the work W, cutting of the circumferential groove is started. Cutting machining is continued until the shaft 2 is to be at groove depth of the machining target. Here, the disc 3 is rotated on the shaft 2 in the counterclockwise direction as viewing from the opposite side to the shaft 2 in FIG. 4B.

FIG. 4A is a plane view illustrating a state that the cutting edge 4 enters into the work most deeply. A cutting start point is a position at which contacting to the work W is started at the most upstream side as viewing from the rotation direction of the disc 3. Then, a cutting finish point is a position being an exit from the work W at the most downstream side, as viewing from the rotation direction of the disc 3, of a cutting edge trajectory after passing through a most deeply entering position in the work. In the following, the most deeply entering position in the work is called the deepest point of the cutting edge trajectory. The groove is gradually formed as the deepest point being on an inner diameter and the cutting start point and the cutting finish point being on an outer diameter as viewing the end face of the work W from the plane.

Here, the groove is not formed in parallel to the center line of the work W in radially sectioned shape. That is, in FIGS. 4A and 4B, a kerf on the end face of the work W is to be a line connecting the cutting start point and the cutting finish point. When viewing FIG. 4B as a side view, the cutting edge 4 passes through the inside of the work W being on a trajectory as a chord connecting the cutting start point and the cutting finish point having the midpoint of the chord being at the deepest point.

Here, the groove machining is performed until groove depth of the machining target is obtained as rotating the work W on the center point O while maintaining the shaft 2 continuously in parallel to the work W. Consequently, the sectional shape of the groove is to be determined with one turn of the work W on the center O against a cutting edge arc face of which chord is the line connecting the cutting start point and the cutting finish point as the midpoint of the chord being the deepest point within the work W.

Accordingly, in the case that machining of groove shape is performed at the end face of the rotating work by utilizing the side cutter 1, when the machining is performed so that the deepest point of the cutting edge trajectory is matched with the groove arc trajectory, a point on a tool trajectory projected on the machining face is to be apart from the arc curve of the groove toward the outer side of the groove by δ in a direction of an axis (hereinafter, the axis is defined as x-axis) which is obtained as projecting, on the work face, a straight line from the deepest point of the cutting edge 4 in the work to the center axis of the work W, as illustrated in FIG. 4A. Here, in the plane view, x-axis is matched with the shaft 2 of the side cutter 1 as being fixed regardless of the work rotation during machining.

Currently, there are two types of coordinate systems for NC machine tools as follows.

(1) Machine Coordinate System

A coordinate system indicating a structure of machine tool itself in which the original point position and directions of x, y, z axes are not varied even when a rotating table having a work mounted thereon is rotated.

(2) Table Coordinate System

A coordinate system in which the original point position is circumferentially moved and directions of x, y, z axes are varied when a rotating table having a work mounted thereon is rotated as being a coordinate system virtually set in numerical control (NC).

Among the above, the machine coordinate system of (1) is adopted in the present invention. Accordingly, the original point is continuously located at the same position and the x-axis direction is not varied regardless of the work rotation.

Here, δ denotes deviation occurring in the x-axis direction between the projected tool trajectory at each point on the tool trajectory and the arc curve of the groove being the target shape as tracing the projected tool trajectory from the cutting start point to the deepest point or from the deepest point to the cutting finish point. Difference between the tool trajectory and the groove arc at the cutting start point is denoted by δs and difference between the tool trajectory and the groove arc at the cutting finish point is denoted by δf.

The deviation δ is to be the maximum value at the cutting start point δs and the cutting finish point δf. Then, the larger the cutting edge radius of the side cutter 1 against the machining target radius is or the larger the groove depth of the machining target is, the larger the deviation δ becomes.

In this manner, the projected trajectory of the cutting edge is to be apart outside from the groove arc curve. Further, the entering depth of the cutting edge becomes deep from zero to the deepest point in an arc-like manner from the cutting start point to the deepest point. On the contrary, the entering depth of the cutting edge becomes shallow in an arc-like manner from the deepest point to the cutting finish point. Accordingly, as illustrated in FIG. 5, at the time when the machining is completed, the sectional shape of the machined groove has a curve-face-like bank occurring at an outer wall part thereof so that groove width is lessened in the depth direction.

In the following, the reason of the bank occurrence will be described further in detail with reference to FIG. 6.

In FIG. 6, numerals are used only in this drawing. Here, it is assumed that the machining target shape of the groove is a true circle having a side face perpendicular to a work. The trajectory of the side cutter is denoted by 1, the groove arc on the work face of the machining target shape is denoted by 2, the trajectory of the groove arc of the machining target shape at arbitrary depth from the work face is denoted by 3 to 5, and the trajectory of the groove arc at the deepest point of the machining target shape is denoted by 6.

Here, a point on the face of the work W on which the deepest point 22 is projected is assumed to be an original point O', an axis oriented toward the work center axis from the original point O' in parallel to the work face (in other words, an axis obtained by projecting the tool rotating shaft on the work face) is assumed to be x-axis, an axis being perpendicular to x-axis on the horizontal plane is assumed to be y-axis, and an axis being vertically perpendicular to x-axis is assumed to be z-axis.

Here, arbitrary points on the groove arc trajectory of the machining target shape respectively at certain depth are denoted by 7 to 10. Further, points on the cutting edge trajectory 1 at positions corresponding in the y-axis direction to the respective points 7 to 10 on a plane perpendicular to z-axis are denoted by 11 to 14. Then, line segments respectively connecting 7 with 11, 8 with 12, 9 with 13, and 10 with 14 denote the deviation δ in the x-axis direction between the abovementioned cutting edge trajectory and the groove arc of the machining target shape. In particular, length of the line segment connecting 7 with 11 is to be the deviation of between the cutting edge trajectory and the groove arc of the machining target shape at the cutting finish point.

Next, arcs 15 to 18 passing through the points 11 to 14 are drawn around the center axis of the work W in a section being parallel to the work W face, that is, in a section being perpendicular to z-axis. Then, the point 7 to 10 on the groove arc of the machining target shape are moved respectively along the groove arcs 2 to 5 to the point O' to 22 on z-axis which is parallel to the work center axis and which passes through the point O', that is, "y=0".

Similarly, the points 11 to 14 are moved respectively along arcs 15 to 18 to points 23 to 26 on the x-z plane as being "y=0". Then, a curve line connecting the points 23, 26 and 22 is to be a bank curve line at the outer wall occurring when the groove is machined with the side cutter type. The above becomes an error against the groove arc of the machining target shape.

In this manner, with the machining method to arrange a side cutter horizontally against a machining face, it is difficult to accurately finish arbitrary groove shape owing to influence of a bank. Extent thereof is to be related to a ratio of a diameter of a tool against a groove diameter. In general, the larger the diameter of a used tool is, the larger a bank occurs at an outer wall of the groove. Meanwhile, in a case with a tool of a small diameter, although extent of a bank occurring at the outer wall is small, a deep groove cannot be machined owing to the small diameter of the tool as being disadvantageous in machining efficiency and tool heating as well.

In addition, as described above, the shaft 2 of the tool 1 is lowered to be close to the work W as being continuously maintained in parallel. Accordingly, as illustrated in FIG. 7, with the work W having a protruded portion at the front side of a machining groove and the like, there occurs interference between the shaft 2 and the protruded portion causing a problem that it is impossible to machine a groove having predetermined depth or deeper.

CITED DOCUMENT

Patent Document

Patent document 1: Japanese Patent Application Laid-open No. 11-300505
Patent document 2: Japanese Patent No. 3757807

SUMMARY OF THE INVENTION

Problems to be Solved by the Invention

To address the above, when cutting an abovementioned work to form a circular or arc-like groove, the present invention reduces or prevents bank occurrence with higher accuracy of groove shape while utilizing advantage of low heat buildup and elongated tool lifetime of machining with a side cutter. In addition, the present invention ensures sufficient groove depth while avoiding interference with a work even when a small-diameter tool is used.

Means to Solve the Problems

To address the above issues, the present inventors focused on that difference between the above cutting edge trajectory occurring in the x-axis direction and a groove arc of a machining target shape or the deviation δ can be arbitrarily set by forming the cutting edge trajectory within a work to be an ellipse viewing in a plane view as devising shapes of the tool and cutting edge as needed while inclining a rotating shaft of the tool against a work end face.

Specifically, cutting machining methods as described in the following are adopted to the present invention.

(1) In a cutting machining method for performing circumferential groove machining as forwarding the cutting tool which is attached to the rotating shaft extending to an inner side from an outer side of the rotating work into the work in a depth direction, the rotating shaft is downwardly inclined toward the inner side of the work at a predetermined inclination angle B, relation between the inclination angle B and deviation δ in the x-axis direction between the trajectory of the cutting edge within the work and the arc of the groove which is the machining target shape is acquired from the following equation for arranging the trajectory to be a part of an ellipse of which minor axis is oriented in the radial direction connecting the deepest point thereof and the center of the work as viewing in a plane view, and the work is cut as machining is performed until the cutting tool reaches groove depth of a machining target while maintaining the inclination angle B, so that the deviation δ can be set against depth t at an arbitrary point on the trajectory viewing from the work face.

Here, x-axis denotes an axis toward the work center axis in parallel to the work face from the original point being the point on the work face on which the deepest point is projected or a projected axis of the rotating shaft on the work face.

[Equation 11]

$$\delta = (a_d - t)\tan B - \frac{D}{2} + \frac{1}{2}\sqrt{D^2 - \frac{4d(a_d - t)}{\cos B} + \frac{4(a_d - t)^2}{\cos B^2}} \quad (11)$$

Here, D denotes a diameter of the groove shape to be machined, $a_d$ and d denote respectively depth of the groove shape to be machined and a diameter of the cutting edge trajectory, and $0 \le t \le a_d$ is satisfied.

(2) A bank occurring at an outer circumferential wall or an inner circumferential wall of the groove is to be capable of being adjusted by selecting a value of deviation δ at a cutting start point, at a cutting finish point, or between the cutting start point and the cutting finish point among the deviation δ.

(3) The cutting is performed plural times as differentiating the inclination angle.

(4) The deviation occurring in the x-axis direction is to be reduced by selecting shapes of a cutting edge support portion of the cutting tool and the cutting edge.

To efficiently perform the above cutting machining methods, cutting machining apparatuses as described in the following are adopted to the present invention.

(5) A cutting machining apparatus which performs circumferential groove machining as forwarding the cutting tool attached to the rotating shaft extending to an inner side from an outer side of the rotating work into the work in a depth direction includes cutting tool inclining means which downwardly inclines the rotating shaft of the cutting tool toward the inner side of the work at a predetermined inclination angle B. The deviation δ in the x-axis direction between a trajectory of the cutting edge within the work and the arc of the groove which is the machining target shape is to be capable of being set for depth t at an arbitrary point on the trajectory viewing from the work face by adjusting the inclination angle B so that the trajectory is to be an ellipse of which minor axis is oriented in the radial direction connecting the deepest point thereof and the center O of the work as viewing in a plane view.

Here, x-axis denotes the axis toward the work center axis in parallel to the work face from the original point being the point on the work face on which the work deepest point is projected or the projected axis of the rotating shaft on the work face, and the inclination angle B is determined by acquiring relation thereof with the deviation δ in the x-axis direction between the trajectory and the arc of the groove which is the machining target shape from the following equation.

[Equation 12]

$$\delta = (a_d - t)\tan B - \frac{D}{2} + \frac{1}{2}\sqrt{D^2 - \frac{4d(a_d - t)}{\cos B} + \frac{4(a_d - t)^2}{\cos B^2}} \quad (12)$$

Here, D denotes a diameter of the groove shape to be machined, $a_d$ and d denote respectively depth of the groove shape to be machined and a diameter of the cutting edge trajectory, and $0 \leq t \leq a_d$ is satisfied.

(6) The cutting tool includes a spreading portion which spreads from the rotating shaft and the cutting edge is attached to a distal end of the spreading portion.

Effects of the Invention

Here, when the depth t of an arbitrary point on the trajectory of the cutting edge viewing from the work face is zero, the above equation for calculating the deviation δ in the x-axis direction expresses deviation δs, δf in the x-axis direction between the cutting edge trajectory and the groove arc at the cutting start point or the cutting finish point. In the case of "$t=a_d$", the equation for calculating the deviation δ in the x-axis direction expresses the deviation in the x-axis direction between the cutting edge trajectory and the groove arc at the deepest point. In this case, δ necessarily becomes to zero enabling to perform machining so that the cutting edge trajectory and the groove arc are matched at the deepest point.

Since values of the diameter D and depth $a_d$ of the groove to be machined are fixed, δ is expressed as a function of the tool diameter d, the depth t at an arbitrary point on the cutting edge trajectory, and the inclination angle B of the tool. When δ has a negative value, the cutting edge trajectory is projected on the outer side of the groove arc. On the contrary, when δ has a positive value, the cutting edge trajectory is projected on the inner side of the groove arc.

Further, when the diameter d of the tool to be used is determined, δ at each point is acquired with the value of the inclination angle B in an area relating to cutting ($0 \leq t \leq a_d$) of the cutting edge trajectory. When the inclination angle B of the tool is zero, it is to be the side cutter type in which the tool shaft is parallel to the work face. When the inclination angle B of the tool is enlarged, the cutting edge trajectory projected on the work face is shifted to the inner side of the groove arc.

From the above, δ of each point in the entire area ($0 \leq t \leq a_d$) of the cutting edge trajectory relating to cutting is grouped into any one of the following three cases depending on magnitude of the inclination angle B of the tool.

(1) Case with Small Inclination Angle B

When the inclination angle B is gradually enlarged from zero in the entire area of $0 \leq t \leq a_d$, the tool trajectory is projected on the outer side of the groove arc until the deviation δs, δf between the cutting edge trajectory and the groove arc at the cutting start or finish point (i.e., t=0) becomes zero. In this case, a bank occurs only at the outer side of the groove.

(2) Case that Tool is Further Inclined from Inclination Angle B Causing δs=0 and δf=0

Here, the cutting edge trajectory projected on the work face is projected on the inner side of the groove arc at the vicinities of the cutting start point and the cutting finish point and the cutting edge trajectory is projected on the outer side of the groove arc at the vicinity of the deepest point. In this case, banks occur at both inner side and outer side of the groove.

(3) Case that Inclination Angle B is Further Enlarged

When the inclination angle B of the tool is set to satisfy "δ>0" in equation 1 in the entire area ($0 \leq t \leq a_d$), the tool trajectory to be projected is entirely at the inner side from the groove arc. In this case, a bank occurs only at the inner wall of the groove.

In this manner, according to the cutting machining method of the above (1), the abovementioned deviation δ occurring in the x-axis direction can be set to an arbitrary value by inclining at a predetermined angle with respect to the work end face so that a contacting point between the cutting edge of the cutting tool and the work is located downward and arranging the cutting edge trajectory to be an ellipse of which minor axis is oriented in the radial direction connecting the deepest point and the center O of the work. Accordingly, machining can be actualized at high accuracy even when the machining target shape is a groove having a vertical side wall, for example.

According to the cutting machining method of the above (2), the deviation δ occurring in the x-axis direction can be easily calculated and optimal inclination angle can be selected.

According to the cutting machining method of the above (3), it becomes possible to adjust the shape of the bank occurring at the outer circumferential wall or the inner circumferential wall of the groove by selecting a value of the deviation δ at the cutting start point, cutting finish point or between the cutting start point and the cutting finish point among the deviation δ.

According to the cutting machining method of the above (4), it becomes possible to reduce a bank occurring at the inner wall side or the outer wall side of the groove by performing a plurality of times of cutting as differentiating the inclination angle.

According to the cutting machining method of the above (5), it becomes possible to arbitrarily set the deviation in the x-axis direction by selecting the shape of the cutting edge support portion of the cutting tool and the cutting edge in addition to the inclination angle.

According to the above (6), since the cutting machining apparatus is provided with cutting tool inclining means which downwardly inclines the rotating shaft of the cutting tool toward the inner side of the work at a predetermined inclination angle, the inclination angle can be freely and continuously adjusted and the cutting machining methods of the above (1) to (5) can be actualized easily and effectively.

According to the cutting machining apparatus of the above (7), the cutting edge is attached to the distal end of the spreading portion which spreads from the rotating shaft, it becomes possible to perform machining of a deeper groove while preventing interference between the tool and the work.

EMBODIMENTS OF THE INVENTION

In the following, embodiments of the present invention will be described with reference to the drawings.

Embodiments

Figure 8B:
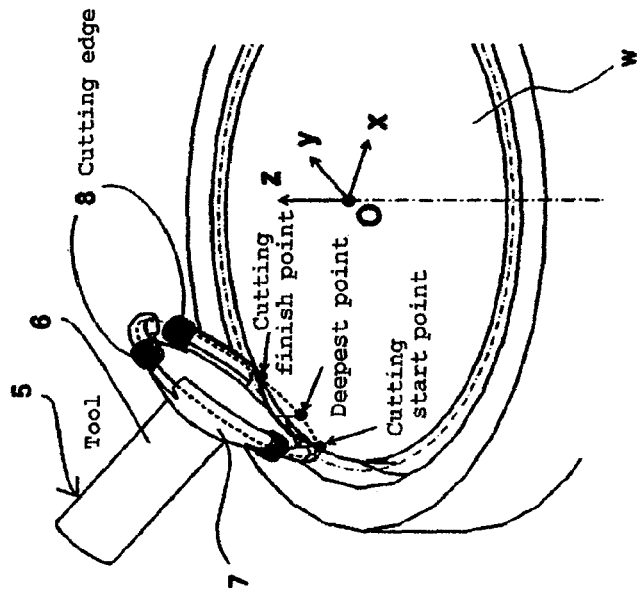
FIG. 8B illustrates a state that a cutting edge of a tool reaches the deepest point in the embodiment.
Figure 8A:
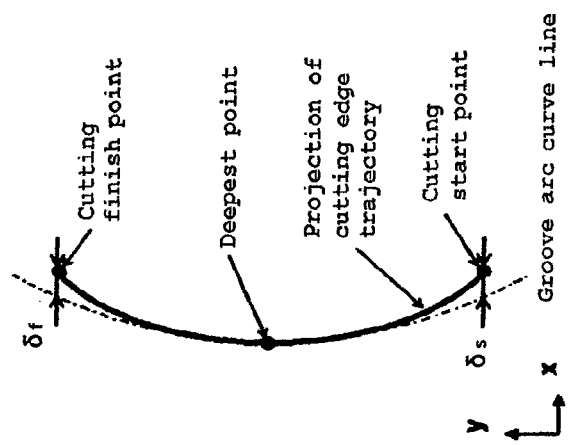
FIG. 8A illustrates a state that a cutting edge of a tool reaches the deepest point in the embodiment.
Figure 8C:
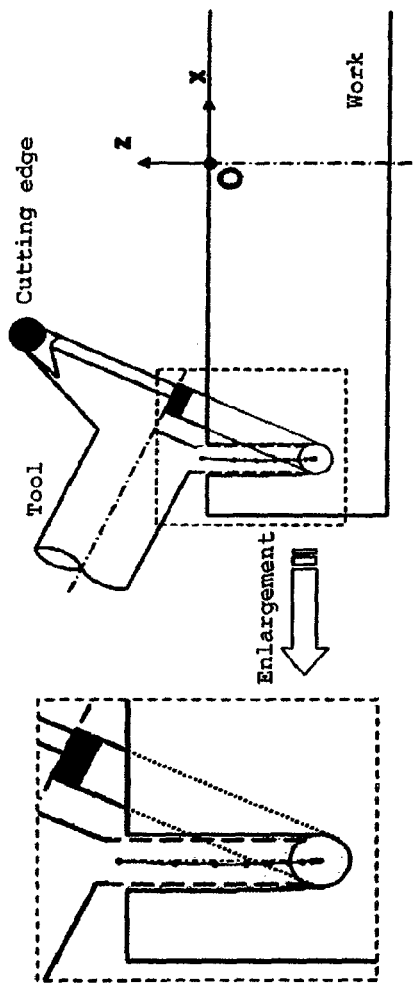
FIG. 8C illustrates a state that a cutting edge of a tool reaches the deepest point in the embodiment.

FIGS. 8B and 8C respectively illustrate a perspective view and a plane view when machining is performed with a tool 5 of the present invention on a work W to form a circumferential groove which is a target shape.

The tool 5 of the present invention is constituted with a rotating shaft 6, a spread portion 7 of which center axis is matched with the rotating shaft 6 and which gradually spreads being trumpet-shaped (e.g., being top-flat conical), and cutting edges 8 which are placed at an outer circumferential end part of the spread portion 7 at even intervals. The rotating shaft 6 is extended toward an outer circumferential side of the work W having an angle B against an end face of the work W.

The tool 5 is rotationally driven at high speed by a machining machine (not illustrated) in the counterclockwise direction when viewing the rotating shaft 6 axially from the center O side of the work W. Positioning thereof can be performed so as to freely determine a position from the center O of the work W, depth of cut, and further the abovementioned inclination angle are freely to be arranged. Here, the work W is held on a machining table (not illustrated) and is also rotationally driven in the counterclockwise direction in FIG. 8B.

In this embodiment, the tool having the spread portion 7 is utilized. However, depending on a groove shape (i.e., depth and width) or required machining accuracy, it is also possible to utilize a general side cutter in which cutting edges are attached to a disc face which is perpendicular to a shaft.

FIGS. 8A-C illustrate a state that the cutting edge 8 of the tool 5 reaches the deepest point.

Figure 1A:
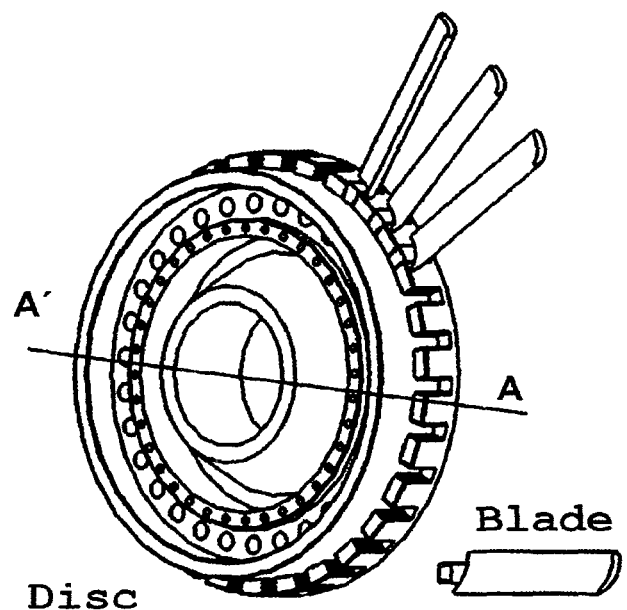
FIG. 1A illustrates a machining example of a disc and blades of a turbine which is utilized for a jet engine.
Figure 1B:
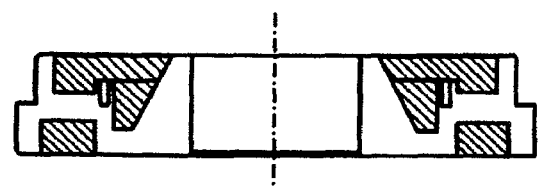
FIG. 1B illustrates a cross-section of the machining example of a disc from FIG. 1A.
Figure 2:
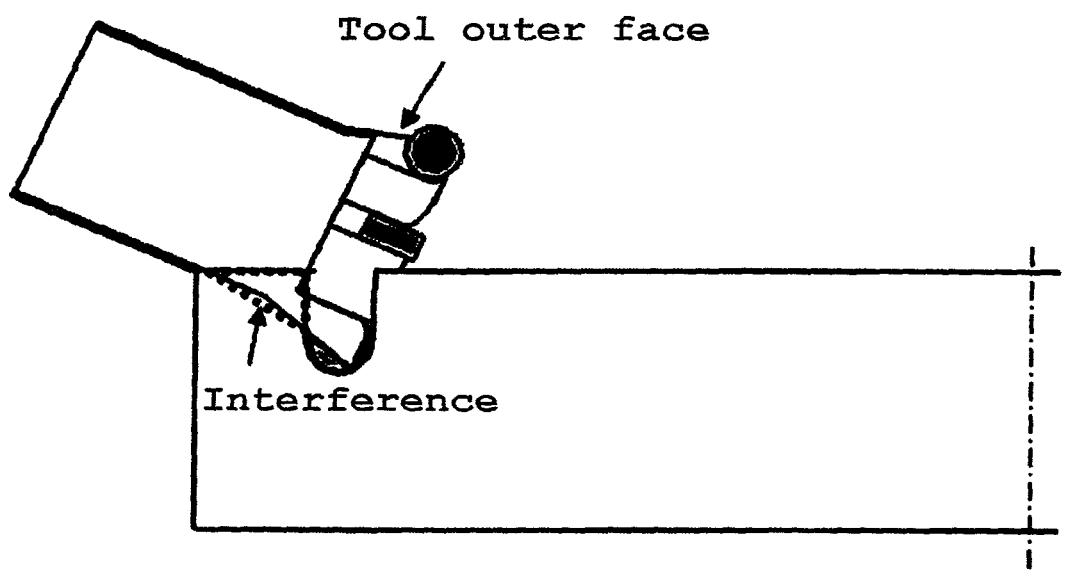
FIG. 2 illustrates an example of cutting machining in a case of utilizing a milling cutter.
Figure 3:
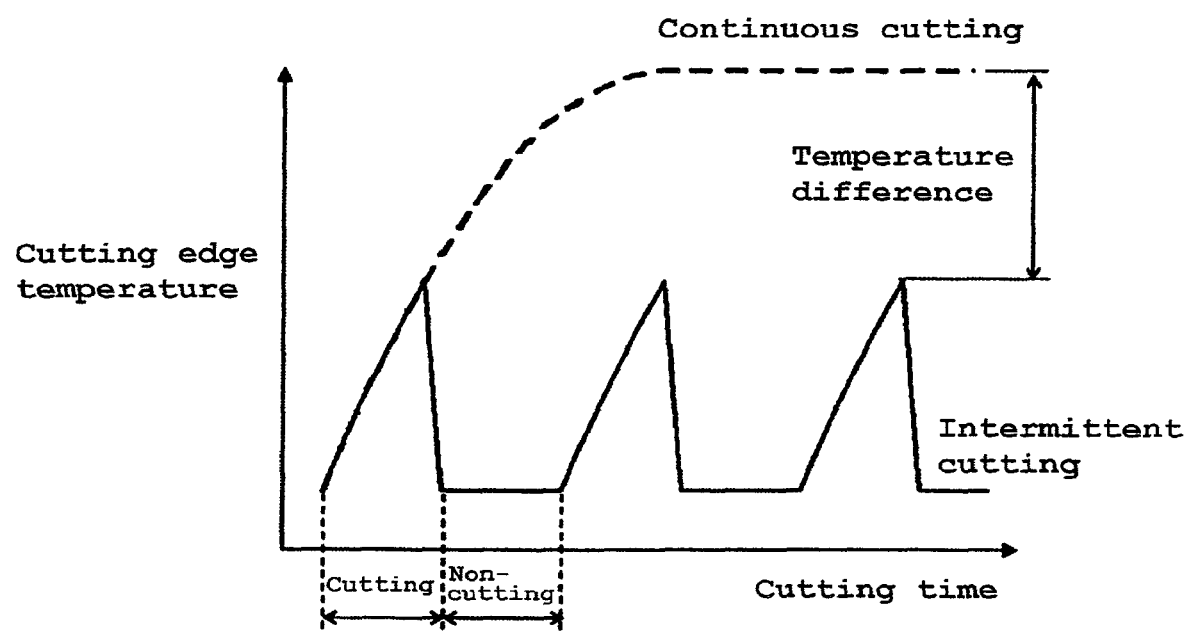
FIG. 3 illustrates an example of temperature variation of a cutting edge being associated with machining.
Figures 4A, 4B:
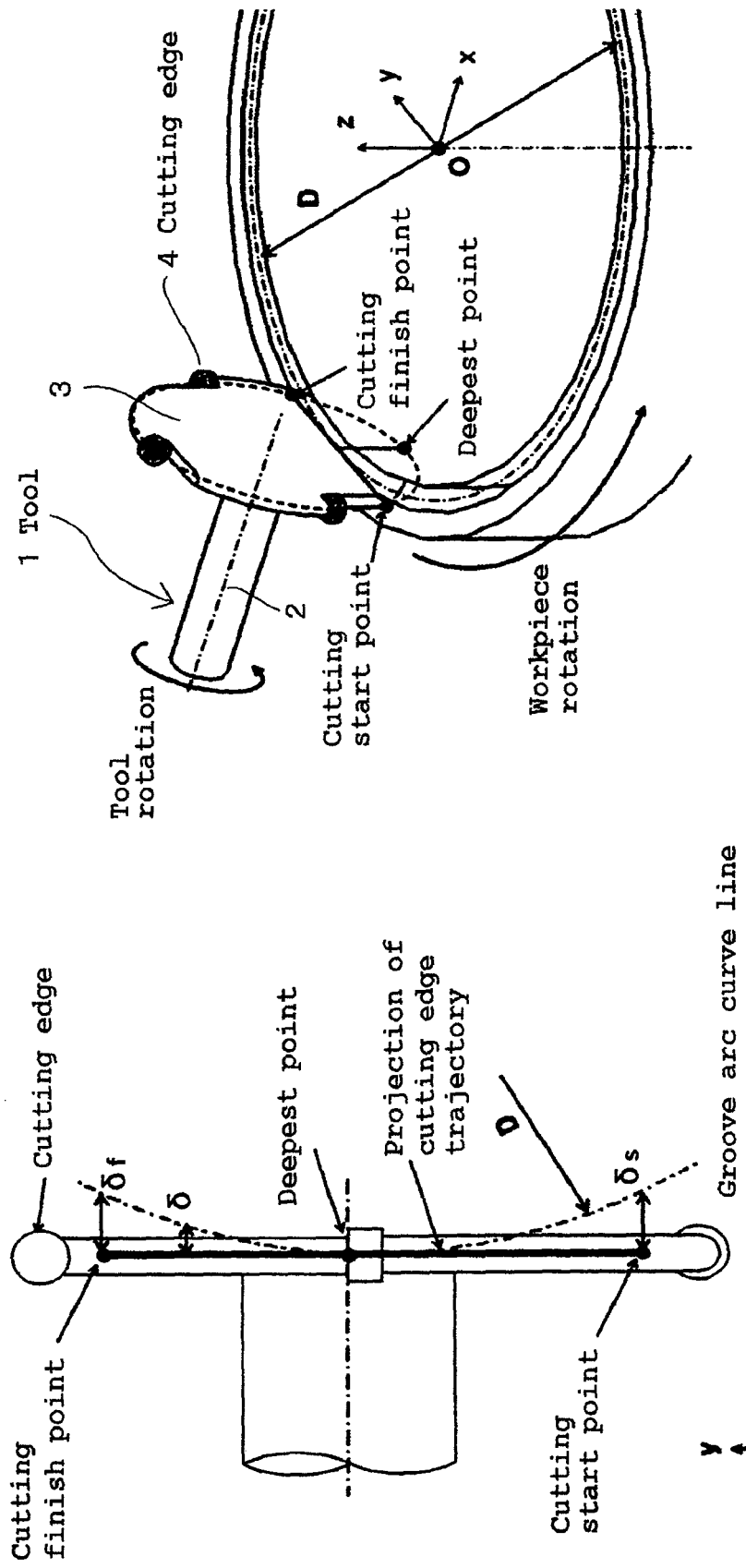
FIG. 4A illustrates deviation δ between a cutting edge trajectory projected on a work end face and an arc curve line of a groove when a rotating shaft of a side cutter is maintained in parallel to a work.
FIG. 4B illustrates deviation δ between a cutting edge trajectory projected on a work end face and an arc curve line of a groove when a rotating shaft of a side cutter is maintained in parallel to a work.
Figure 5:
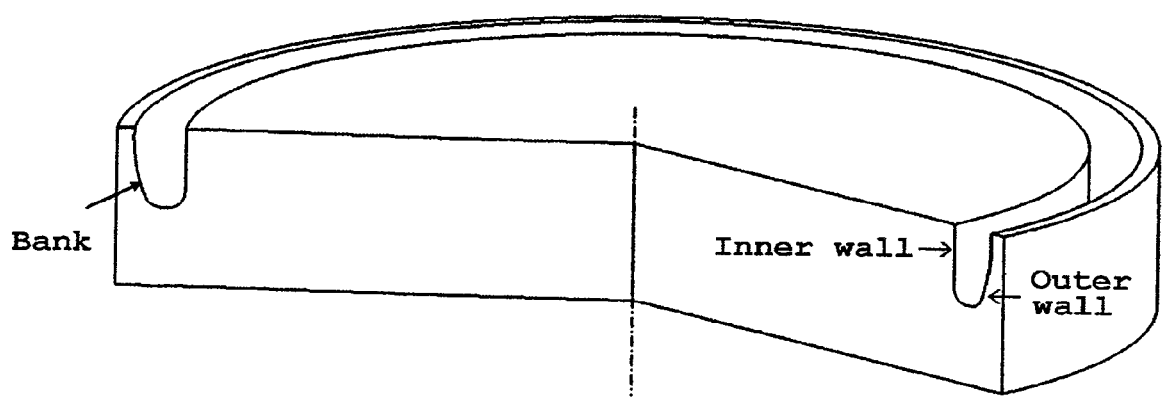
FIG. 5 illustrates a state that a bank is formed at an outer wall side of the groove when the rotating shaft of the side cutter is maintained in parallel to the work.
Figure 6:
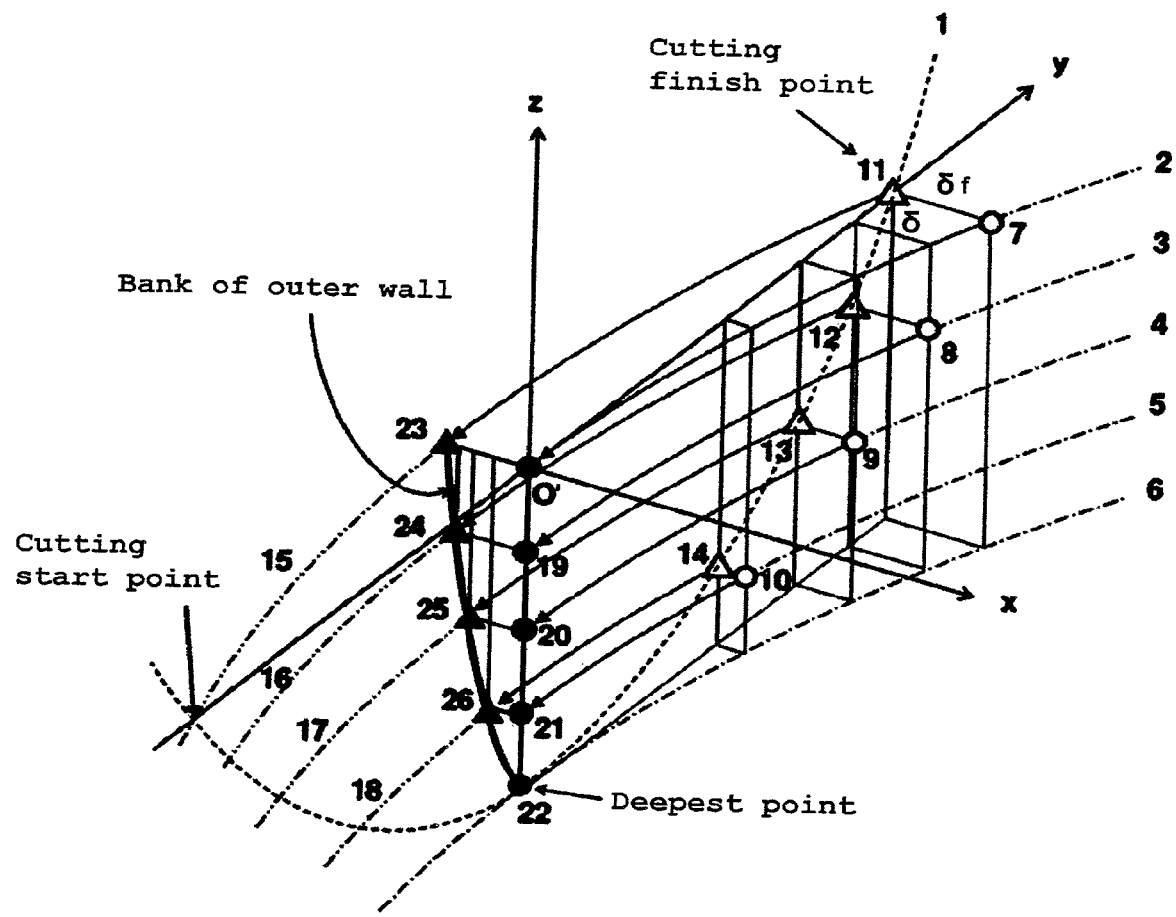
FIG. 6 is an explanatory view of bank occurrence at the outer wall of the groove when the rotating shaft of the side cutter is maintained in parallel to the work.
Figure 7:
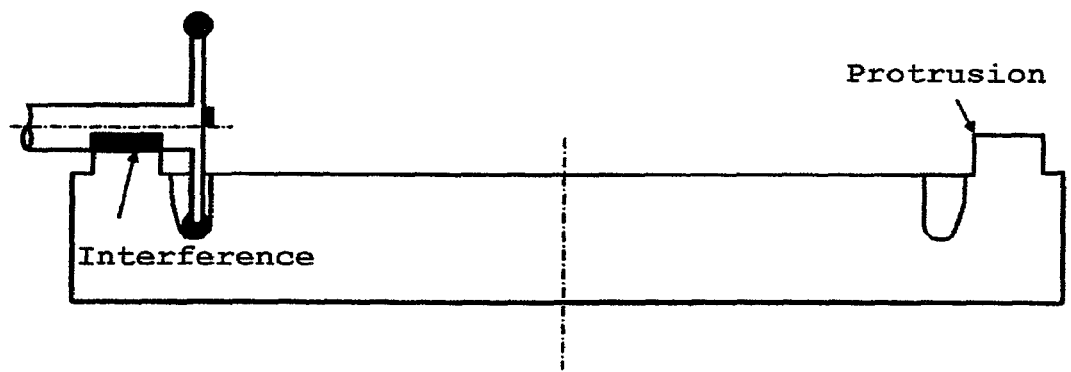
FIG. 7 illustrates a state that a side cutter in the related art interferes with a work.

The cutting edges 8 are placed at the outer circumferential end of the spread portion 7 and are rotated at high speed on a circular trajectory having the rotating shaft 6 as the center. Here, since the rotating shaft 6 is inclined against the end face of the work W, a cutting start point and a cutting finish point form an ellipse of which minor axis is oriented in the radial direction connecting the deepest point and the center O of the work W. As illustrated in FIG. 8A, as viewing the circular trajectory in the plane view, it becomes possible to remarkably reduce difference occurring in the normal direction at the deepest point, that is, in the axial direction toward the work center axis from the work deepest point of the cutting edge 8 as being in parallel to the work face or a deviation δ compared to the case of performing machining while maintaining the rotating shaft 6 as being in parallel to the work W as in FIG. 2.

Figure 9:
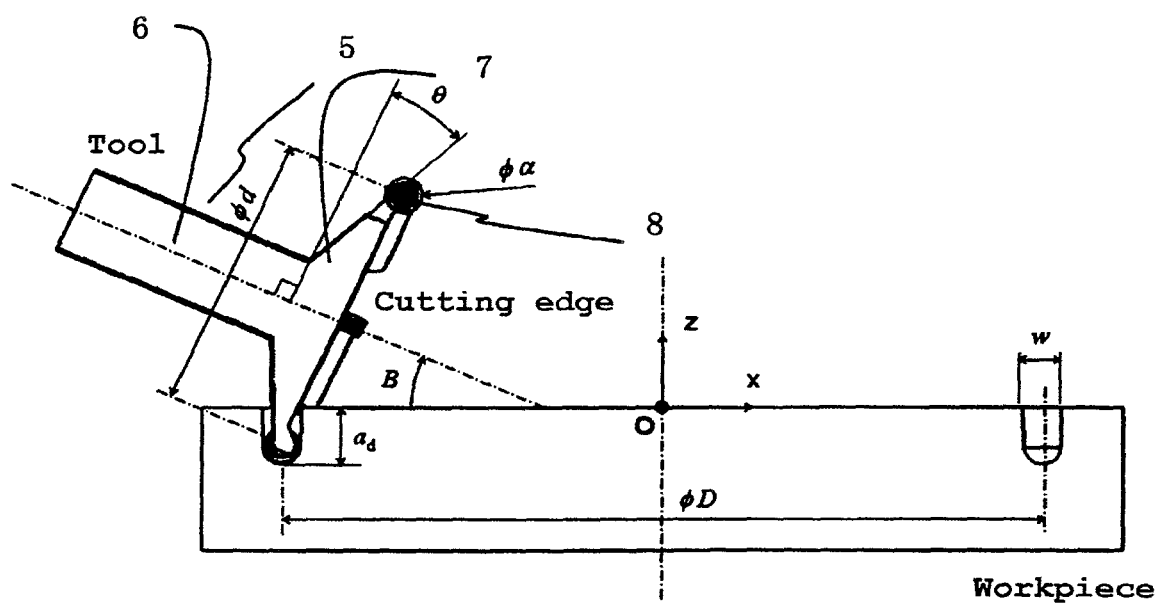
FIG. 9 illustrates a state that the tool is inclined.

Here, the reason why the above deviation δ can be reduced will be described in detail with reference to FIGS. 10 to 13 on a case that the diameter and depth of the groove shape being the machining target are denoted respectively by D and $a_d$ and machining is performed with the tool having a diameter of d being inclined by B from a machining face as illustrated in FIG. 9.

Figure 10:
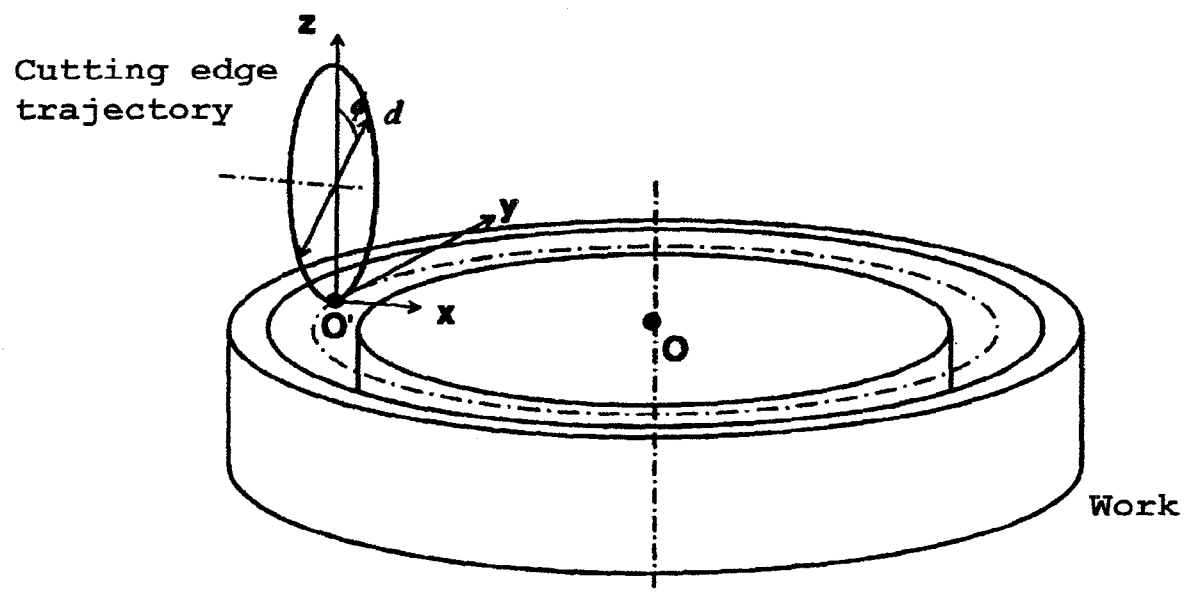
FIG. 10 illustrates a state that the cutting edge of the tool is contacted to a work face when the tool is being horizontal to the work.

In FIG. 10, a contacting point between the work face and the cutting edge trajectory of the cutting edge 8 right before cutting of the work W with the cutting edge 8 is assumed to be an original point O', an axis oriented toward the center point O from the original point O' along the work face is assumed to be x-axis, an axis being perpendicular to x-axis at the original point O' on the horizontal plane is assumed to be y-axis, and an axis being vertically perpendicular thereto at the original point O' is assumed to be z-axis.

Figure 11:
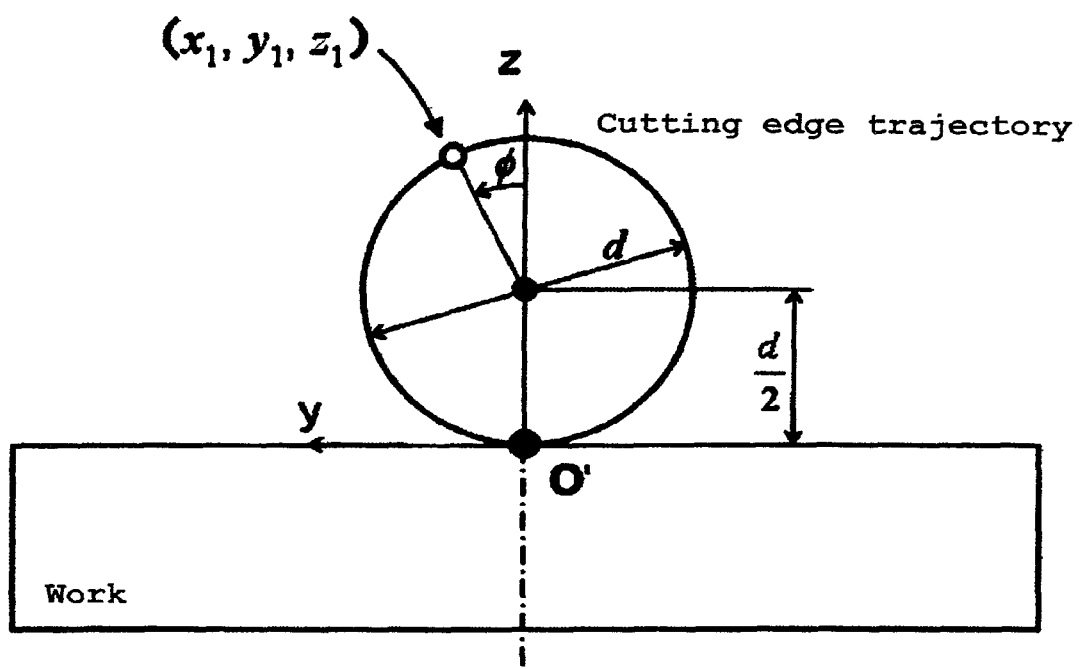
FIG. 11 illustrates a specific point of the cutting edge.

Assuming that the shaft of the tool with a cutting edge having a diameter of d is to be arranged in parallel to x-z plane as illustrated in FIG. 11, a trajectory of a point $(x_1, y_1, z_1)$ having an angle φ from an uppermost point of the cutting edge can be expressed as follows.

$x_1 = 0$ $y_1 = d/2 \cdot \sin \phi$ $z_1 = d/2 \cdot \cos \phi + d/2$

Figure 12:
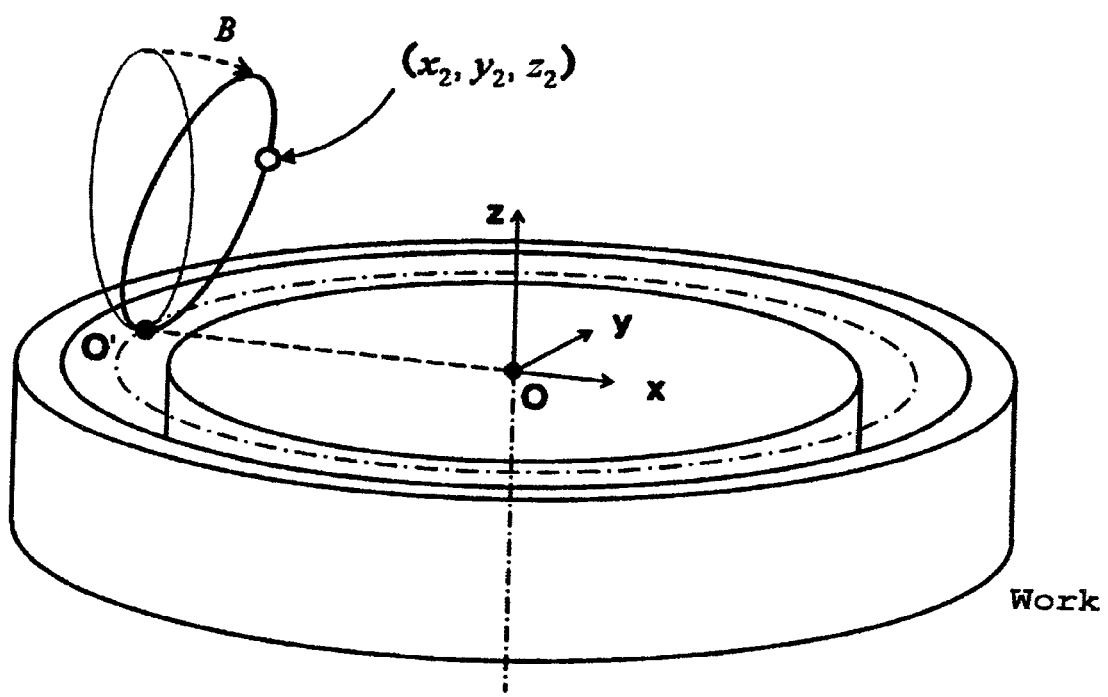
FIG. 12 illustrates how the specific point is moved on coordinates when a tool is inclined.

Next, when the rotating shaft of the tool is inclined by angle B within z-x plane having the original point O' as the center as illustrated in FIG. 12, the point $(x_1, y_1, z_1)$ of angle φ varies as follows.

$x_2 = x_1 \cdot \cos B + z_1 \cdot \sin B$ $y_2 = y_1$ $z_2 = -x_1 \cdot \sin B + z_1 \cdot \cos B$ Here, the point $(x_1, y_1, z_1)$ of angle φ can be expressed as follows by utilizing the tool diameter d, the angle φ from an uppermost point of the cutting edge, and inclination angle φ.

$x_2 = d/2 \cdot (\cos \phi + 1) \cdot \sin B$ $y_2 = d/2 \cdot \sin \phi$ $z_2 = d/2 \cdot (\cos \phi) + 1) \cdot \cos B$ Here, the cutting edge trajectory projected on the work face is indicated by $x_2$ and $y_2$. When the inclination angle B is varied, $x_2$ is varied and $y_2$ is not varied.

Figure 13B:
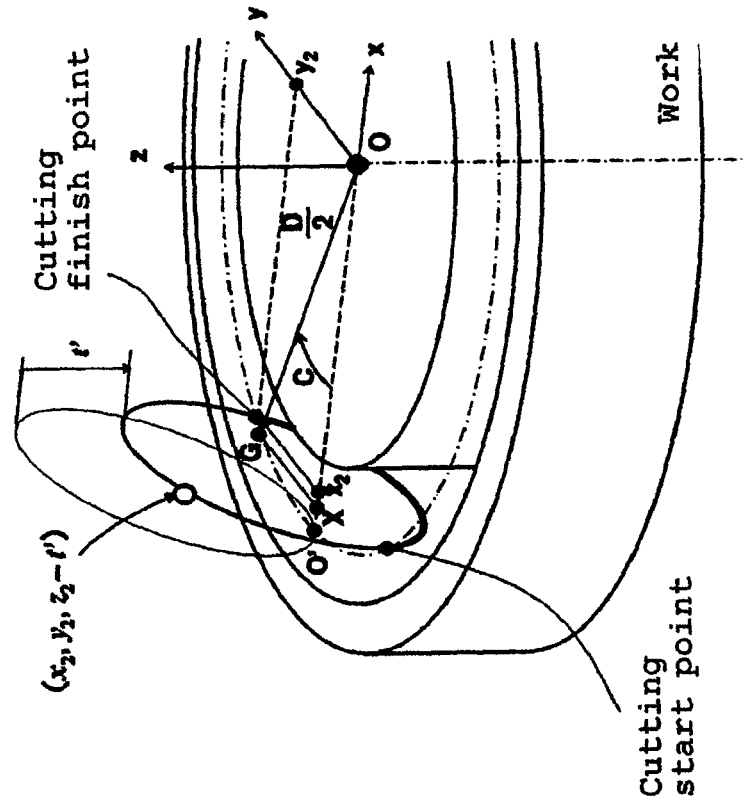
FIG. 13B illustrates a cutting area when a cut is provided as inclining the tool.
Figure 13A:
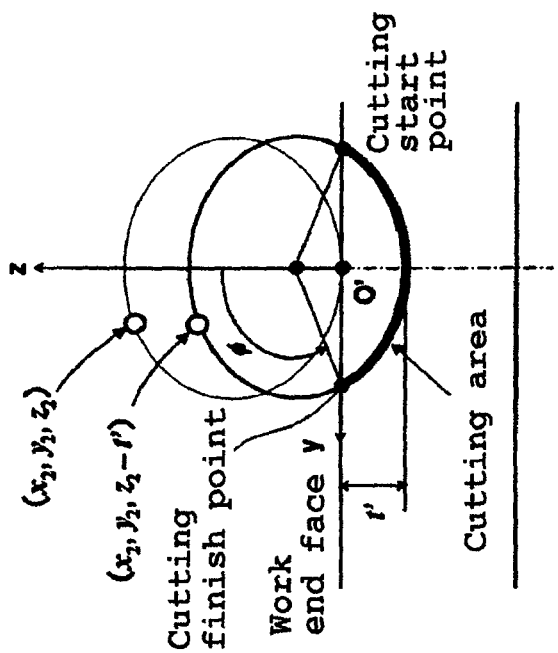
FIG. 13A illustrates a cutting area when a cut is provided as inclining the tool.

Here, it is assumed to focus on an area relating to cutting among the cutting edge trajectory. As illustrated in FIGS. 13A and 13B, when a cut amount provided to the work is denoted by t' ($0 \leq t' \leq a_d$), the area satisfying "$z_2-t' \leq 0$" is the part of the cutting edge trajectory which relates to cutting among the cutting edge trajectory. Since "$z_2-t'=d/2 \cdot (\cos \phi +1)\cos B - t' \leq 0$" is satisfied, the cut area is to be a range which satisfies "$|\cos \phi| \leq 2t'/(d \cdot \cos B) - 1$" among the center angle $\phi$.

From the above, a projected ellipse trajectory of the tool is expressed as follows.

$$x_2 = d/2 \cdot (\cos \phi + 1) \cdot \sin B$$

$$y_2 = d/2 \cdot \sin \phi$$

as, $$|\cos \phi| \leq 2t'/(d \cdot \cos B) - 1$$

Here, when a point G of which value of y is $y_2$ is assumed to be at a position on an arc curve line of the groove as being rotated by an angle C from a straight line connecting the work center O with the original point O' being a point to which the work deepest point 22 of the cutting edge is projected on the face of the work W, the following equation 2 is to be satisfied.

[Equation 2]

$$\frac{D}{2} \sin C = y_2 \qquad (2)$$

$$\sin C = \frac{2y_2}{D}$$

$$\cos C = \sqrt{1 - \sin^2 C}$$

$$= \sqrt{1 - \frac{4y_2^2}{D^2}}.$$

Further, the value of the point G in x-direction is expressed as the following equation 3.

[Equation 3]

$$X = \frac{D}{2} - \frac{D}{2} \cos C = \frac{D}{2} - \frac{D}{2} \sqrt{1 - \frac{4y_2^2}{D^2}} \qquad (3)$$

On the other hand, the angle $\phi$ of the cutting edge trajectory is expressed as the following equation 4 by utilizing $z_2$.

[Equation 4]

$$z_2 = \frac{d}{2}(\cos \phi + 1)\cos B \qquad (4)$$

$$\cos \phi = \frac{2z_2}{d \cos B} - 1$$

$$\sin \phi = \sqrt{1 - \left(\frac{2z_2}{d \cos B} - 1\right)^2} = \sqrt{\frac{4z_2}{d \cos B} - \frac{4z_2^2}{d^2 \cos B^2}}$$

Likewise, $y_2$ is expressed as the following equation 5 by utilizing $z_2$.

[Equation 5]

$$y_2 = \frac{d}{2} \sin \phi \qquad (5)$$

$$= \frac{d}{2} \sqrt{\frac{4z_2}{d \cos B} - \frac{4z_2^2}{d^2 \cos B^2}}$$

$$= \sqrt{\frac{dz_2}{\cos B} - \frac{z_2^2}{\cos B^2}}$$

From the above, assuming that $\delta$ denotes deviation between the cutting edge trajectory in the x-axis direction and the arc trajectory of the groove of the machining target shape at all points of the cutting edge trajectory projected on the machining face in the cutting edge trajectory (i.e., the contacting arc between the cutting edge and the work) which relates to cutting, $\delta$ is expressed as the following equation 6.

[Equation 6]

$$\delta = x_2 - X \qquad (6)$$

$$= \frac{d}{2}(\cos \phi + 1)\sin B - \left\{\frac{D}{2} - \frac{D}{2}\sqrt{1 - \frac{4y_2^2}{D^2}}\right\}$$

Here, the following equation 7 is obtained by substituting equation 4 into $\cos \phi$ of the first term of the right side of equation 6 and substituting equation 5 into $y_2$ of the second term of the right side.

[Equation 7]

$$\delta = \frac{d}{2}\left(\frac{2z_2}{d\cos B} - 1 + 1\right)\sin B - \left\{\frac{D}{2} - \frac{D}{2}\sqrt{1 - \frac{4}{D^2}\left(\sqrt{\frac{dz_2}{\cos B} - \frac{z_2^2}{\cos B^2}}\right)^2}\right\} \qquad (7)$$

$$= \frac{d}{2}\left(\frac{2z_2}{d\cos B}\right)\sin B - \left\{\frac{D}{2} - \frac{D}{2}\sqrt{1 - \frac{4}{D^2}\left(\frac{dz_2}{\cos B} - \frac{z_2^2}{\cos B^2}\right)}\right\}$$

$$= \left(\frac{z_2}{\cos B}\right)\sin B - \frac{D}{2} + \frac{D}{2}\sqrt{1 - \frac{4}{D^2}\left(\frac{dz_2}{\cos B} - \frac{z_2^2}{\cos B^2}\right)}$$

$$= z_2 \tan B - \frac{D}{2} + \frac{1}{2}\sqrt{D^2 - \frac{4dz_2}{\cos B} + \frac{4z_2^2}{\cos B^2}}$$

Here, when cut of target depth $a_d$ (i.e., target groove depth) is provided to the tool, the deviation $\delta$ can be calculated with the following equation 8 as height $z_2$ on the cutting edge trajectory satisfies "$z_2 = a_d - t$".

[Equation 8]

$$\delta = (a_d - t)\tan B - \frac{D}{2} + \frac{1}{2}\sqrt{D^2 - \frac{4d(a_d - t)}{\cos B} + \frac{4(a_d - t)^2}{\cos B^2}} \qquad (8)$$

$$(0 \leq t \leq a_d)$$

Cases of what kinds of banks are formed are divided as follows based on values of $\delta$.

(1) Case of "$\delta s = \delta f = 0$"

Figure 14:
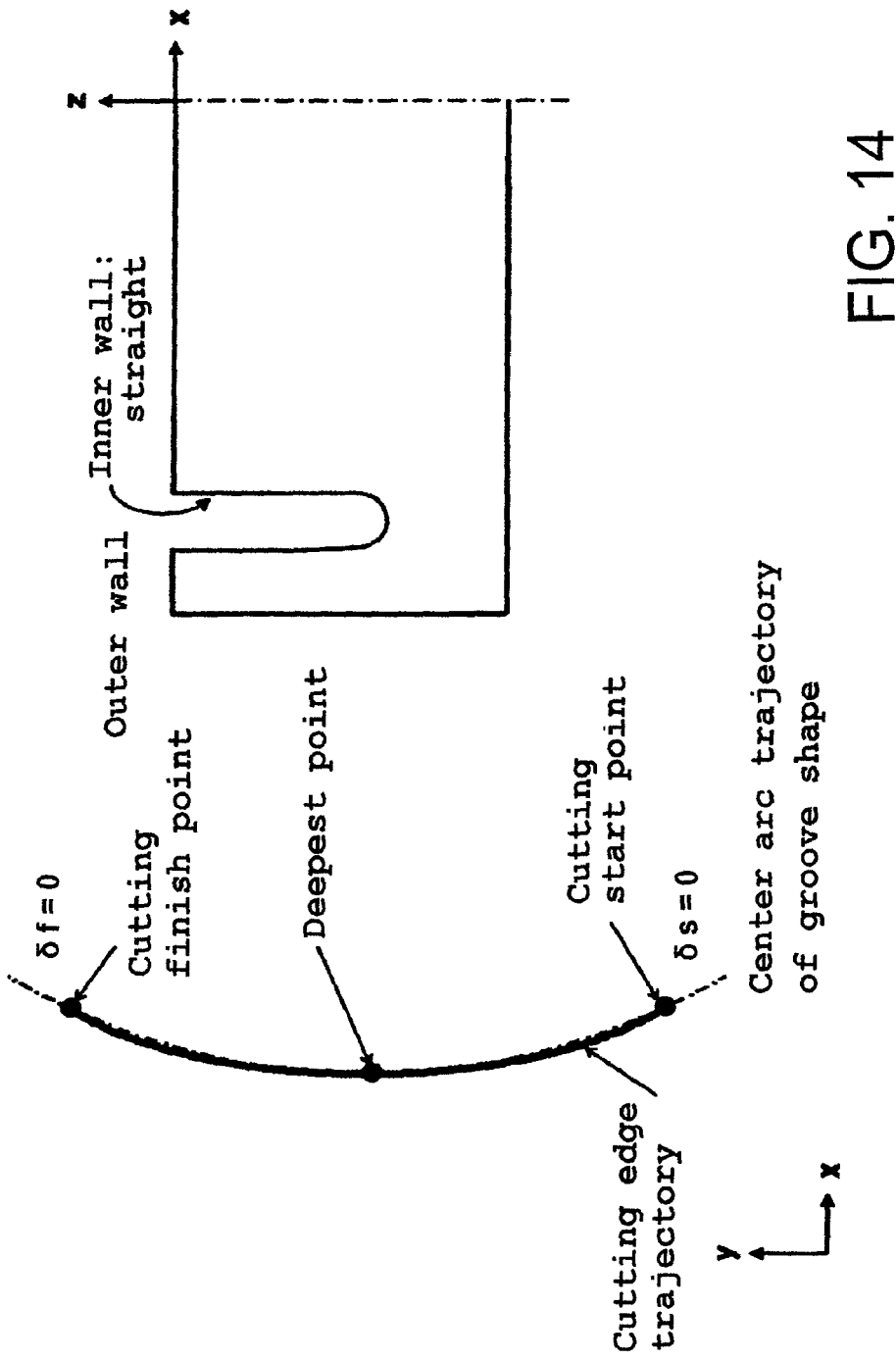
FIG. 14 illustrates a machining example in a case that deviation in the x-axis direction is to be zero at a cutting start point and a cutting finish point.

When D=500 mm, d=150 mm, $a_d$=40 mm, and B=12.825°, for example, $\delta$ satisfies "$\delta s = 0$" and "$\delta f = 0$" at the cutting start point and the cutting finish point, as illustrated in FIG. 14. Accordingly, three points of the cutting start point, the cutting finish point and the deepest point of the tool are matched with the groove arc of the machining target shape, so that an inner wall becomes linear. However, the rest of δ continuously satisfies "δ<0". In the case that deviations at the cutting start point and the cutting finish point are to be zero, a bank occurs at an outer wall of the groove shape to be formed. However, the shape of the outer wall becomes closest to be linear and an outward bank amount is 0.73 mm. The inner wall is to be linear as illustrated.

(2) Case of "δs>0 (δf>0)" and "δ<0" at other cut area

Figure 15:
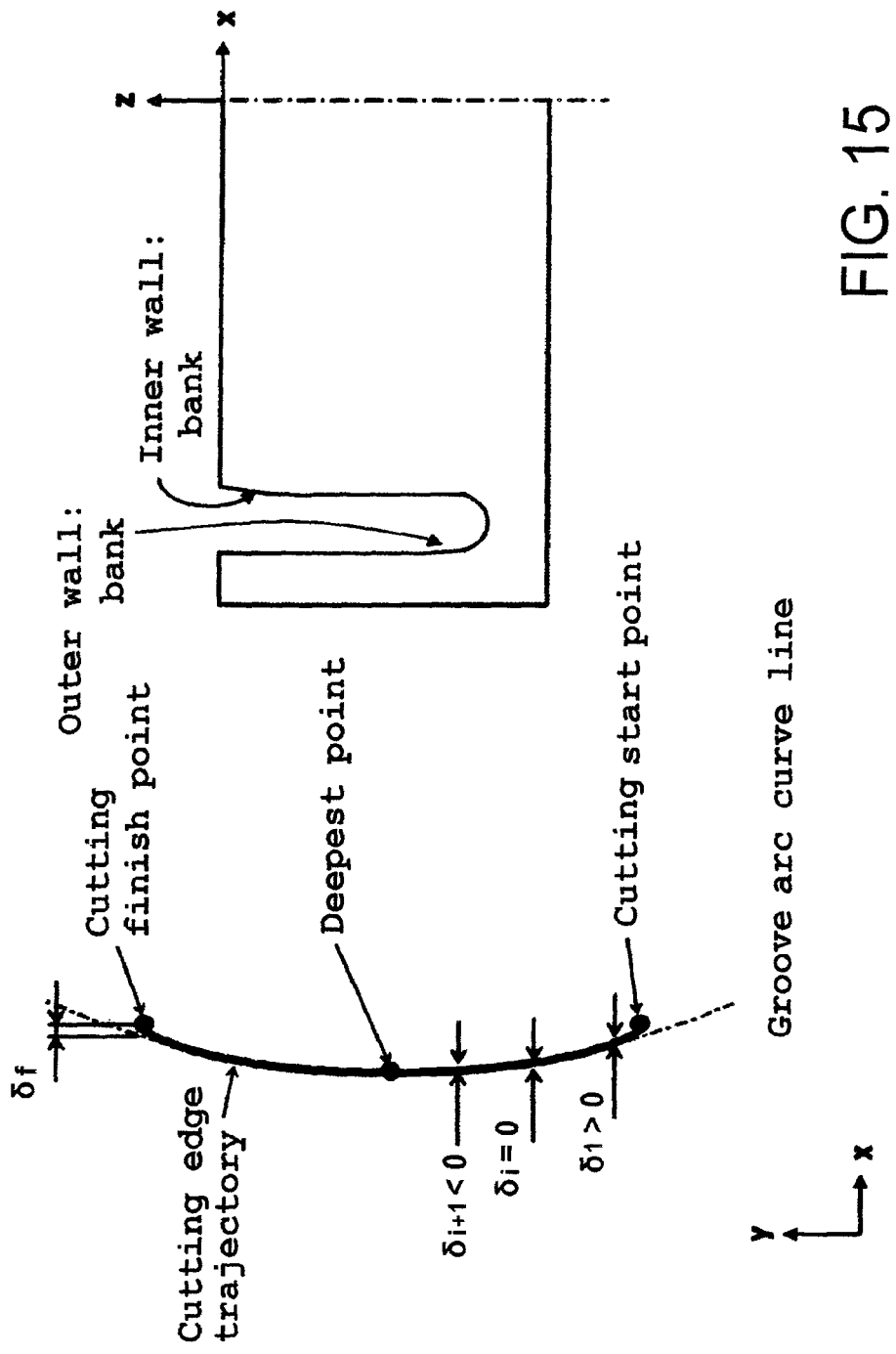
FIG. 15 illustrates a machining example in a case that deviation in the x-axis direction is to be zero at a specific point.

When D=500 mm, d=150 mm, $a_d$=40 mm, and B=14°, for example, δ satisfies "δs=δf=0.81" and "δs=δf>0" at the cutting start point and the cutting finish point, as illustrated in FIG. 15. The tool shaft is more inclined than case (1). Here, "δ>0" is satisfied at the vicinities of the cutting start point and the cutting finish point. δ is to be smaller as approaching to the deepest point, so that a point satisfying "δ=0" occurs. When further approaching to the deepest point, "δ<0" is to be satisfied. In this case, three points in total of the deepest point and other two points are matched with the groove arc in the area which relates to cutting. Banks occurs respectively at the inner wall and the outer wall. An inward bank of 0.67 mm and an outward bank of 0.38 mm occur.

(3) Case of "δs>0 (δf>0)" and "δ>0" at Other Cut Area

Figure 16:
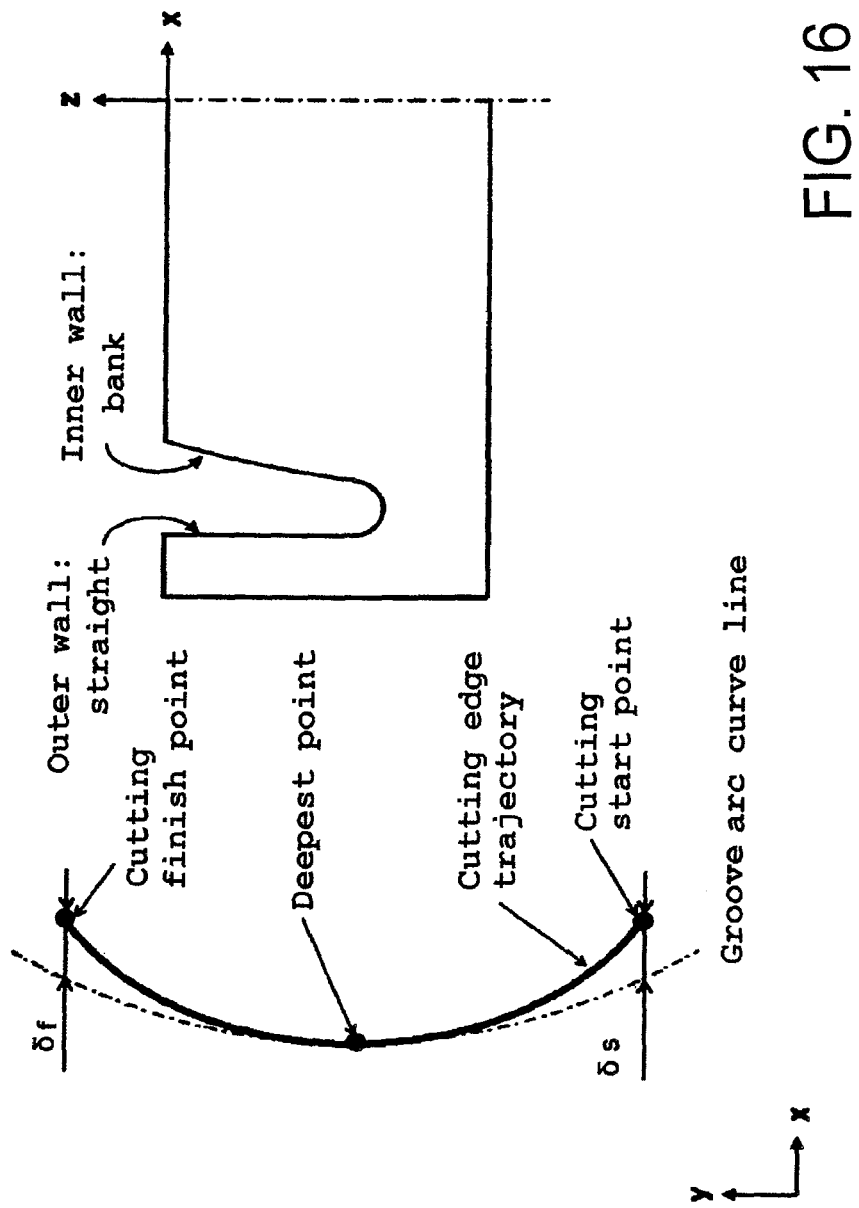
FIG. 16 illustrates a machining example in a case that an outer wall is to be a vertical wall.

When D=500 mm, d=150 mm, $a_d$=40 mm, and B=25°, for example, "δs>0 (δf>0)" are satisfied. That is, the rotating shaft of the tool is largely inclined compared to case (2) against the machining face, so that "δs=δf=8.77 mm" is satisfied, as illustrated in FIG. 16. Although a section of the outer wall of the groove to be formed becomes linear, a bank occurs at the inner wall. An inward bank amount is 8.3 mm.

(4) Case of "δs<0 (δf<0)"

Figure 17:
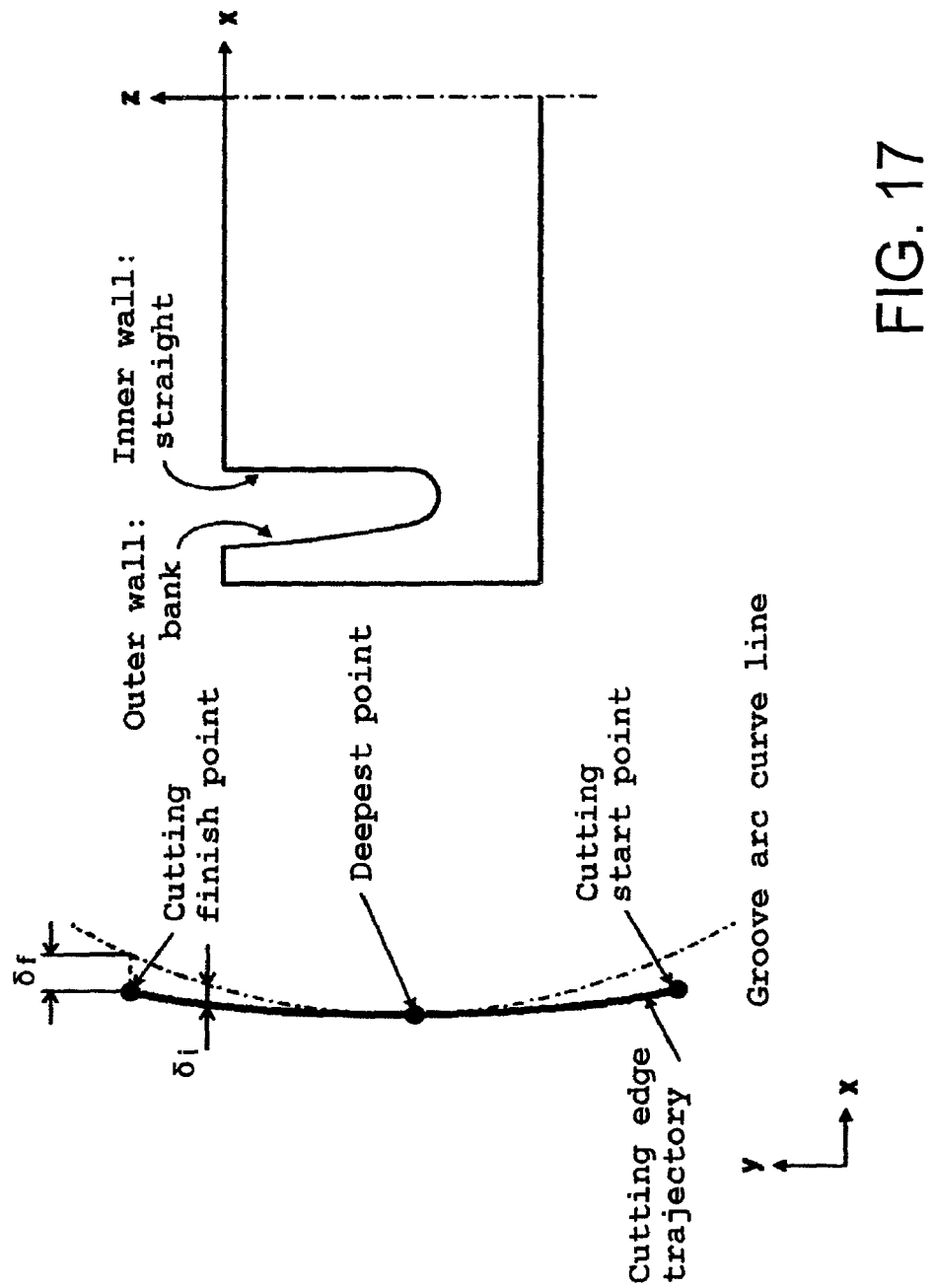
FIG. 17 illustrates a machining example in a case that an inner wall is to be a vertical wall.

When D=500 mm, d=150 mm, $a_d$=40 mm, and B=5°, for example, "δs=δf=-5.29 mm" is satisfied, as illustrated in FIG. 17. The rotating shaft of the tool is approximately parallel to the machining face. Although a bank occurs at the outer wall, the inner wall becomes linear. The inclination angle of the rotating shaft of the tool against the machining face is smaller than that of case (1). A bank amount of the outer wall is 5.27 mm. Here, a case of "B=0" is the case in which machining is performed by a side cutter.

Figure 18:
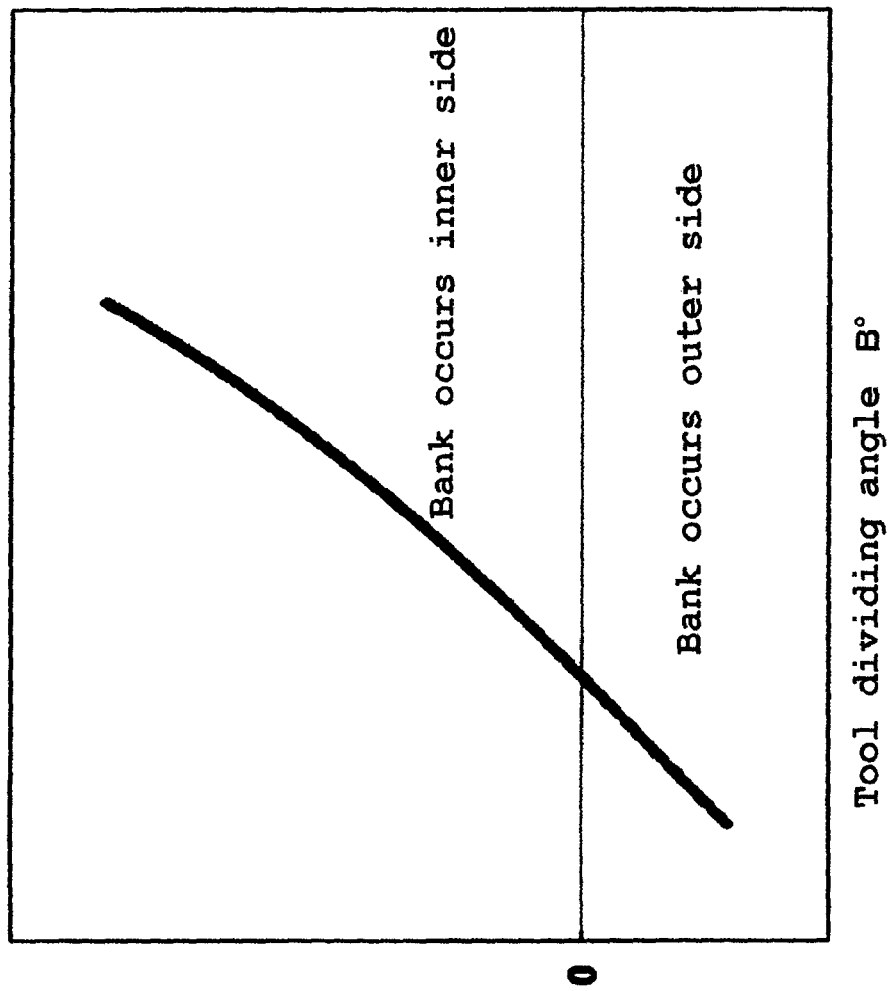
FIG. 18 illustrates relation between an inclination angle of the tool and an occurring bank.

FIG. 18 indicates the above relation. As described above, it is ideal that "δ=0" is satisfied in the entire area of the cutting edge trajectory which relates to cutting. However, since the projected cutting edge trajectory is ellipsoidal while the groove arc is circular, "δ=0" is not actualized.

Further, in order to satisfy "δ=0" continuously at a specific point, the diameter d and the inclination angle B are to be pinpointed for the diameter D and depth $a_d$ of the groove shape to be formed. Accordingly, it is required to prepare a number of tools.

Figure 19:
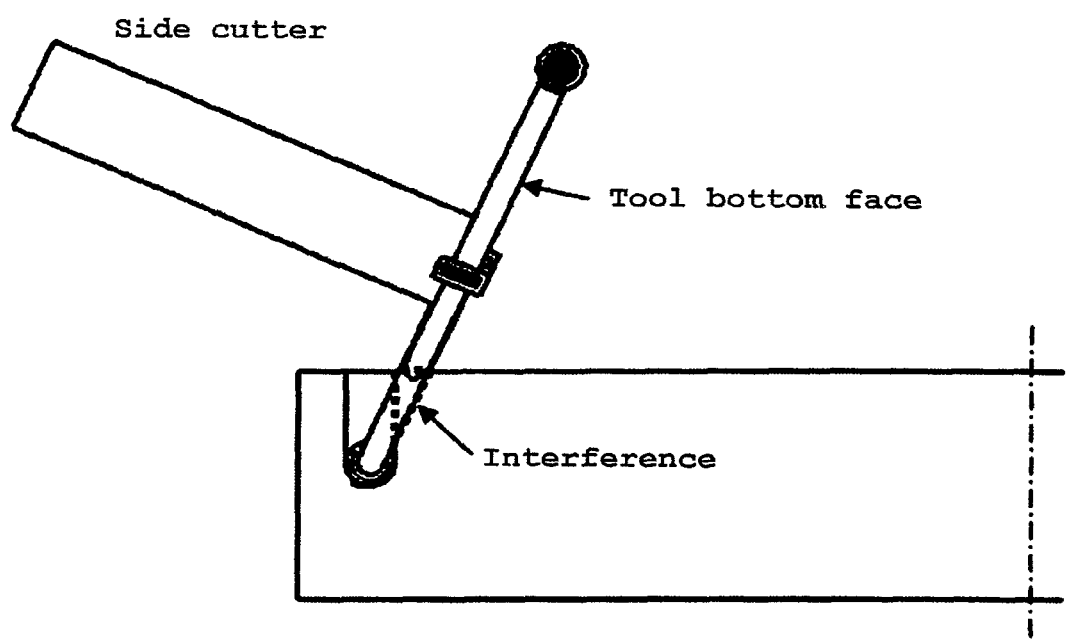
FIG. 19 illustrates a state of interference when the side cutter is inclined.

Further, in the case that the groove being the machining target is narrow and deep, when a side cutter having a flat tool bottom face to which a cutting edge is attached is utilized, the groove having desired depth cannot be formed owing to interference of the tool bottom plate with the formed groove as illustrated in FIG. 19.

Figure 20:
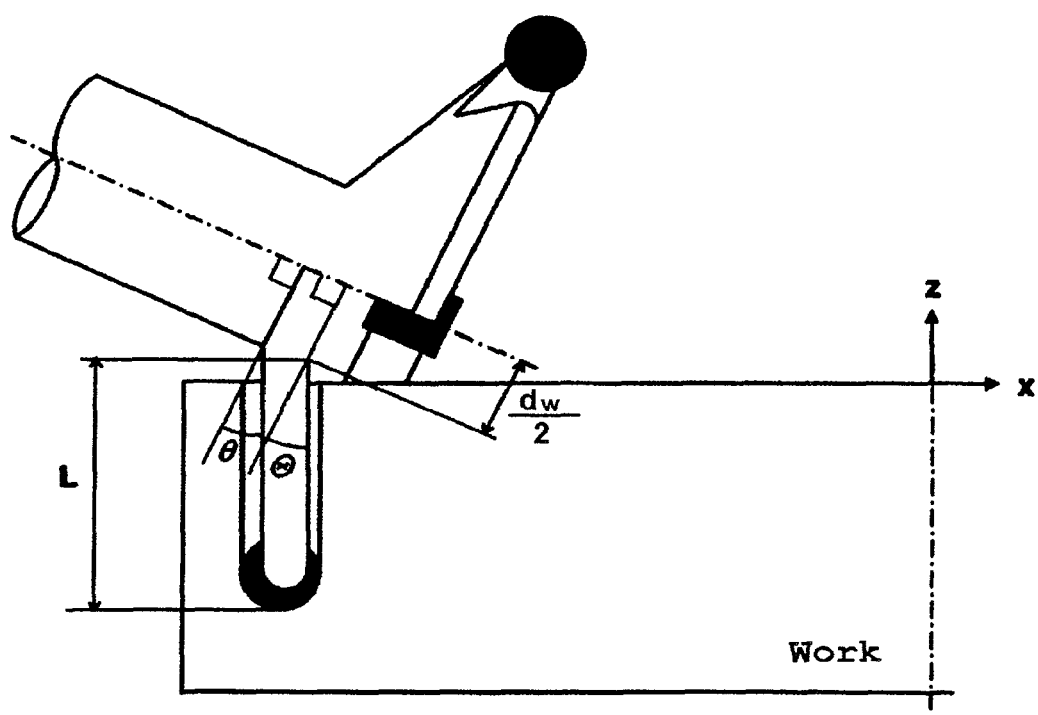
FIG. 20 illustrates a machining example in which a spreading portion is enlarged to be perpendicular to a work.

Accordingly, in order to perform machining to form a narrow and deep groove, a shape of the tool is only required to set the diameter of the spreading portion of the tool as large as possible and have the angle of the spread portion be selected so as to be perpendicular to a work when the rotating shaft of the tool is inclined, as illustrated in FIG. 20. Here, in FIG. 20, cutting edges of a circular type are utilized.

Figure 21:
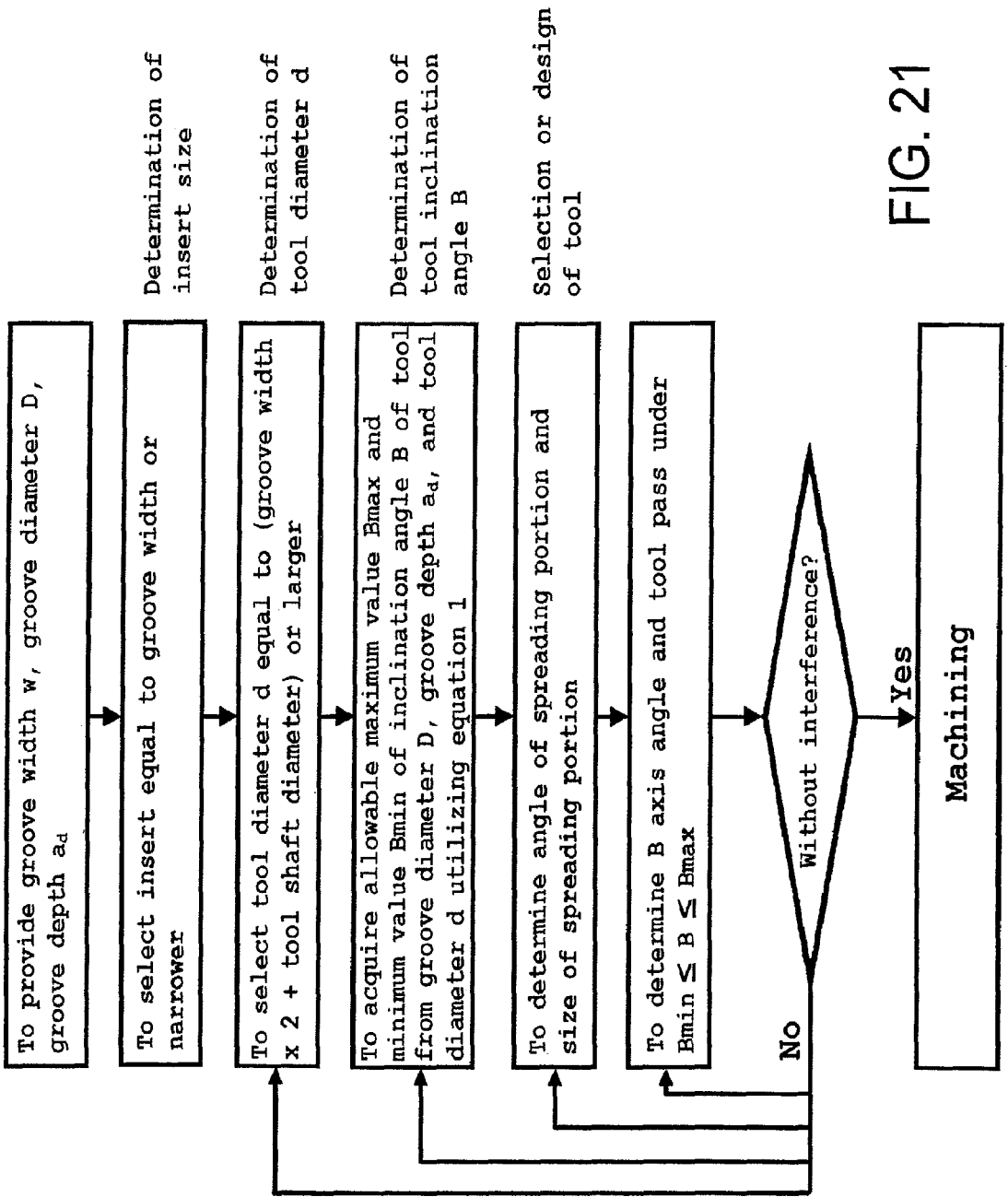
FIG. 21 is a flowchart when actual machining is performed.

FIG. 21 illustrates a flowchart for determining a cutting edge size, a tool diameter d, an inclination angle B, shape (an angle) of the spread portion, and a tool pass.

The width w, diameter D and depth $a_d$ of a groove to be formed are inputted in step 1 and a cutting edge (i.e., an insert) of which size is equal to or smaller than the groove width is selected in step 2.

Next, after the tool diameter d is selected in step 3, an allowable range of the tool inclination angle B (i.e., Bmax and Bmin) is determined by utilizing equation 1 in step 4.

Further, in step 5, the angle of the spreading portion corresponding to the tool inclination angle B is determined, and then, dw is determined so that "L>$a_d$" is satisfied.

Based on the above steps 1 to 5, the tool inclination angle and the tool pass are determined in the range of "Bmin≤B≤Bmax" and machining is performed in step 6. At that time, while interference is checked, it is only required to set B to be close to Bmax for finishing the outer wall with the tool (i.e., to prevent interference between the tool outer face and the groove outer wall) and to set B to be close to Bmin for finishing the inner wall (i.e., to prevent interference between the tool bottom face and the groove inner wall).

Specifically, in a case that the groove is to be formed as the diameter being 500 mm, the depth being 40 mm and the width being 12 mm, "B=0" causes a bank at the outer wall and "B>0" causes interference between the tool and the work and a bank at the inner wall when the tool having circular chips of which diameter is 12 mm being attached to a side cutter of which diameter is 150 mm is to be used.

Then, when B is set to be 12.825° as utilizing the tool selected as described above, the outer wall becomes closest to be linear even though a bank occurs thereat.

In this case, the tool is required that a taper angle of an outer face thereof is 12.825° or smaller and a taper angle of an inner face thereof is 12.825° or larger.

Here, a bank amount of the outer wall is 0.73 mm in this case.

Further, in a case that groove width is sufficiently large, machining of a groove shape without any bank can be actualized by separating the machining process into two processes being inner wall finishing and outer wall finishing or by performing simultaneous multiaxial control including the rotating shaft, for example, as firstly enlarging the inclination angle B to form the outer wall side linear and secondary selecting the inclination angle B, for example.

Specifically, it is assumed that the diameter, depth and width of the groove to be formed are respectively 500 mm, 40 mm and 50 mm, and the inner and outer walls are to be vertically finished as attaching a circular chip of which diameter is 12 mm to a tool of which diameter of the distal end of the spreading portion is 150 mm. First, the inner wall is finished as "B=0".

At that time, a bank of 8.65 mm occurs toward the outside of the wall. However, as being smaller than the width of the groove to be machined, there arises no problem. Next, the outer wall of the groove is vertically finished as inclining the rotating shaft of the tool to be as B=25°. At that time, a bank of 8.3 mm occurs inward. However, as being smaller than the groove width, there arises no problem.

In this manner, both of the inner wall and the outer wall can be finished straight by performing a plurality of times of cutting as differentiating the inclination angle.

Further, in a case that the groove width is sufficiently large, both of the inner wall and the outer wall of the groove can be vertically finished with one time of cut as providing cut to the tool and varying the inclination angle while forwarding the tool in the radial direction.

(1) That is, in a case with a side cutter, when a bank amount toward the outer wall is smaller than the required groove width, cut is firstly provided to finish the inner wall as B=0, and thereafter, the inclination angle is gradually enlarged while forwarding the tool outward in the radial direction of the work. The inclination angle B is gradually varied until the angle at which the outer wall is to be finished straight.

(2) Alternatively, in a case with a tool to which the spreading portion is arranged, being contrary to the side cutter case, the inclination angle B at which the outer wall can be finished straight is provided to the tool shaft, so that the outer wall is finished. Thereafter, the inclination angle is gradually varied to zero while forwarding the tool to the center direction of the work.

When the groove width is sufficiently large, both of the inner wall and the outer wall can be finished with single sequential control by either of the above two methods. The inclination angle is varied to a predetermined angle as being continuously kept within values which do not cause interference between the tool and the work.

Further, regarding the cutting edge, a bank shape to be formed is influenced by the shape of the cutting edge which is to be oriented to a combined direction of the tool inclination angle and the attaching angle of the cutting edge from the cutting start to the deepest point against x-z plane (see FIG. 8C), that is, against the work section.

Figure 22A:
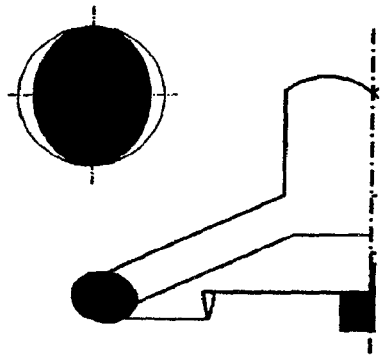
FIG. 22A illustrates a machining example utilizing an ellipse cutting edge.
Figure 22B:
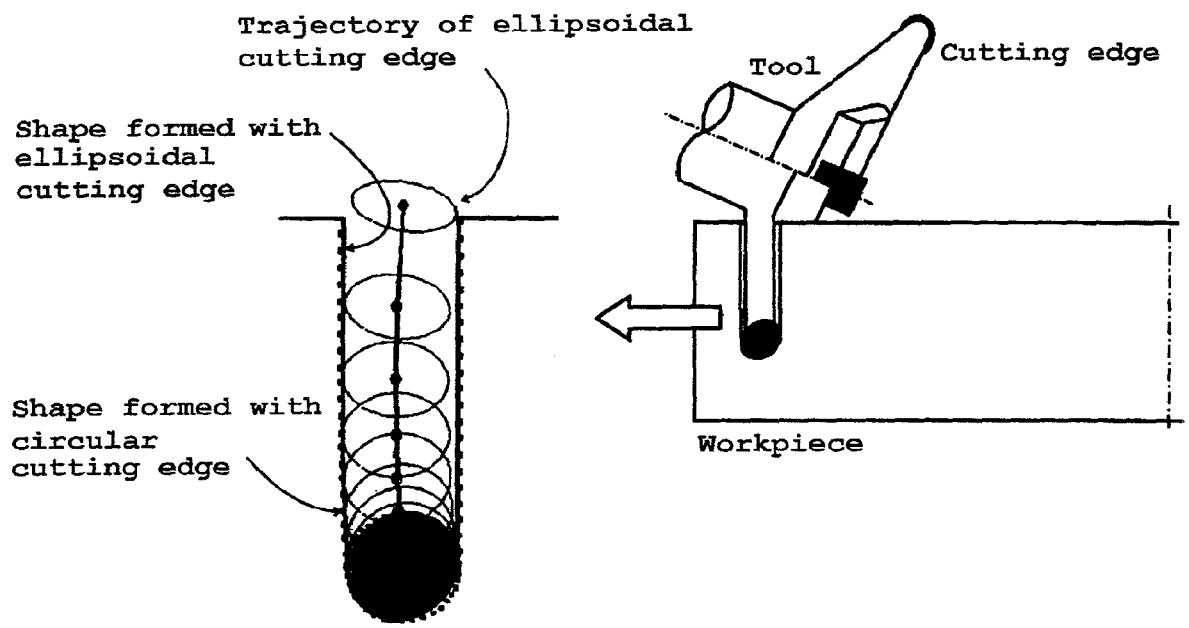
FIG. 22B illustrates a machining example utilizing an ellipse cutting edge.
Figure 23A:
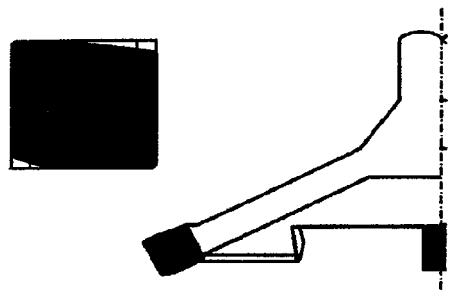
FIG. 23A illustrates a machining example utilizing a rectangular cutting edge.
Figure 23B:
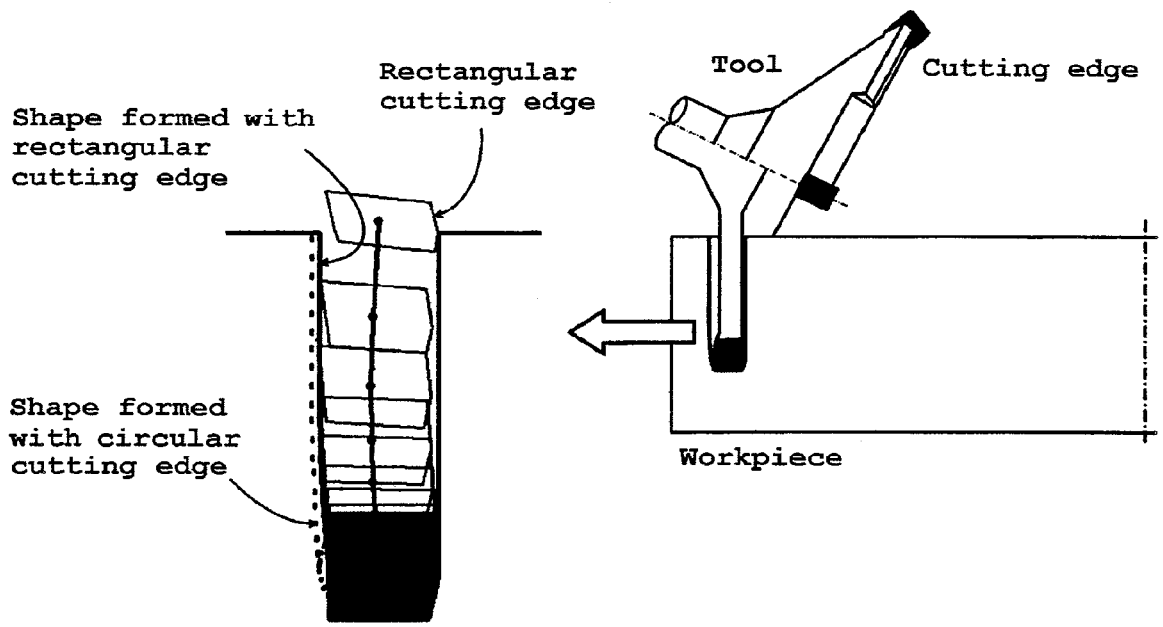
FIG. 23B illustrates a machining example utilizing a rectangular cutting edge.

FIG. 22B illustrates a groove shape formed when ellipse cutting edges are used as illustrating a variation aspect of the cutting edge shape projected on the work section corresponding to a cutting edge position in the groove depth direction. As is evident from FIG. 22B, the shapes of the inner wall and outer wall of the groove are determined by combination of variation of a projected view of the cutting edge on the work section and the trajectory of the center portion of the cutting edge. FIG. 23B illustrates a shape of a groove which is formed when rectangular cutting edges are similarly used.

For example, as illustrated in FIG. 22B, when the ellipse cutting edges are utilized, the groove width can be lessened compared to a machined groove utilizing circular cutting edges (i.e., circular chips). Then, when the ellipse cutting edge is attached as the major axis direction thereof being rotated by a certain angle against the rotating shaft of the tool, the bank amount can be reduced.

As a result of the above, when an optimal shape of a cutting edge is selected corresponding to a diameter, depth and width of a groove being a machining target, a diameter of an distal end of a spreading portion, and the like, optimal machining can be actualized.

INDUSTRIAL APPLICABILITY

As described above, according to the present invention, setting can be arbitrarily performed in the case that deviation δ occurring in the direction of an axis oriented toward a work center axis in parallel to a work face from an original point which is a point on the work face on which the deepest point of cutting is projected or in the direction of an projected axis of a tool rotating shaft on the work face is reduced by inclining the rotating shaft of a cutting tool against a work end, and the like. Accordingly, efficiency improvement of cutting machining and lifetime elongation of the tool can be achieved while enhancing machining accuracy of a groove even when being adopted to groove machining of normal workpiece material as well as difficult-to-cut material. Hence, it is possible to be widely adopted to a variety of cutting machining apparatuses.

DESCRIPTION OF NUMERALS 1, 5 Tool
2, 6 Rotating shaft
3 Disc
4, 8 Cutting edge
7 Spreading portion

The invention claimed is:

1. A cutting machining method for performing circumferential groove machining on a work, rotatable about a work center axis, by advancing a cutting tool, which is attached to a rotating shaft extending, relative to the work center axis, to a radially inner side of the work from a radially outer side of the work, into the work in a depth direction of the work from a face of the work, the method comprising:

determining a desired deviation δ in a direction along an x-axis between a trajectory of a cutting edge of the cutting tool within the work and an arc of a groove which is a machining target shape;

acquiring, from the following equation, an inclination angle B based on the deviation δ, for arranging the trajectory to be a part of an ellipse of which a minor axis is oriented in the radial direction of the work and extends from a deepest point of the trajectory toward the work center axis;

inclining the rotating shaft downward relative to the face of the work as the rotating shaft extends in a direction from the radially outer side toward the radially inner side at the acquired inclination angle B; and cutting the work as machining is performed until the cutting tool reaches a groove depth of a machining target while maintaining the inclination angle B so as to set the deviation δ for cutting depth t at an arbitrary point on the trajectory, wherein the x-axis denotes an axis situated along the intersection of a first plane defined by the face of the work and a second plane either defined by the work center axis and the deepest point of the trajectory or defined by the work center axis and an axis about which the rotating shaft rotates,

[Equation 9]

$$\delta = (a_d - t)\tan B - \frac{D}{2} + \frac{1}{2}\sqrt{D^2 - \frac{4d(a_d - t)}{\cos B} + \frac{4(a_d - t)^2}{\cos B^2}} \quad (9)$$

wherein D denotes a diameter of the groove shape to be machined, $a_d$ and d denote respectively depth of the groove shape to be machined and a diameter of the cutting edge trajectory, and $0 \leq t \leq a_d$ is satisfied.

2. The cutting machining method according to claim 1, further comprising:

adjusting a bank occurring at an outer circumferential wall or an inner circumferential wall of the groove by selecting a value of deviation δ at a cutting start point, at a cutting finish point, or between the cutting start point and the cutting finish point.

3. The cutting machining method according to claim 1, wherein the cutting is performed plural times on the same work with respectively different inclination angles, wherein the respectively different inclination angles are selected based on the equation and are configured to form a predetermined desired groove profile.

4. The cutting machining method according to claim 1, further comprising:

setting the deviation δ in the x-axis direction by selecting shapes of a cutting edge support portion of the cutting tool and the cutting edge in addition to the inclination angle.

5. The cutting machining method according to claim 1, further comprising:
- selecting a tool having a tool edge size narrower than a thickness of the groove;
- inclining the rotating shaft downward relative to the face of the work as the rotating shaft extends in a direction from the radially outer side toward the radially inner side at a second acquired inclination angle B, based on the equation;
- cutting the work a second time as machining is performed until the cutting tool reaches the groove depth of the machining target while maintaining the second inclination angle B
- wherein cutting the work includes forming one of the inner or outer walls of the groove and cutting the work the second time includes forming the other one of the inner or outer walls of the groove.

6. The cutting machining method according to claim 1, further comprising:
- setting the deviation δ in the x-axis direction by selecting an ellipsoidal cutting edge in addition to the inclination angle.

\* \* \* \* \*